United States Patent
Williams

(10) Patent No.: US 9,731,445 B2
(45) Date of Patent: Aug. 15, 2017

(54) ADDITIVE MANUFACTURING SYSTEMS AND METHODS FOR MAGNETIC MATERIALS

(71) Applicant: The Boeing Company, Chicago, IL (US)

(72) Inventor: John D. Williams, Decatur, AL (US)

(73) Assignee: The Boeing Company, Chicago, IL (US)

(*) Notice: Subject to any disclaimer, the term of this patent is extended or adjusted under 35 U.S.C. 154(b) by 91 days.

(21) Appl. No.: 14/831,737

(22) Filed: Aug. 20, 2015

(65) Prior Publication Data
US 2017/0054191 A1   Feb. 23, 2017

(51) Int. Cl.
| | | |
|---|---|---|
| *H01P 1/19* | (2006.01) | |
| *B22F 3/20* | (2006.01) | |
| *B22F 5/00* | (2006.01) | |
| *B29C 67/00* | (2017.01) | |
| *B29C 47/00* | (2006.01) | |

(Continued)

(52) U.S. Cl.
CPC .......... *B29C 47/0004* (2013.01); *B22F 3/008* (2013.01); *B22F 3/1055* (2013.01); *B22F 3/20* (2013.01); *B22F 5/00* (2013.01); *B29C 47/065* (2013.01); *B29C 67/0055* (2013.01); *B29C 67/0081* (2013.01); *C22C 33/02* (2013.01); *H01F 41/00* (2013.01); *H01P 1/183* (2013.01); *H01P 1/19* (2013.01); *H01P 1/32* (2013.01); *H01P 3/06* (2013.01); *H01P 11/005* (2013.01); *B29K 2505/08* (2013.01); *B29K 2995/0008* (2013.01); *B29L 2031/34* (2013.01);

(Continued)

(58) Field of Classification Search
CPC ..... B29C 47/0004; H01F 41/00; H01P 1/183; H01P 1/18; H01P 1/19
USPC .......................................................... 333/236
See application file for complete search history.

(56) References Cited

U.S. PATENT DOCUMENTS

| | | | | |
|---|---|---|---|---|
| 2,929,034 A | * | 3/1960 | Doherty | .............. C04B 35/4682 333/236 |
| 2005/0288813 A1 | | 12/2005 | Yang et al. | |
| 2015/0080495 A1 | | 3/2015 | Heikkila | |

FOREIGN PATENT DOCUMENTS

WO   WO 2013/103600   7/2013

OTHER PUBLICATIONS

Kobayashi et al., "Three-dimensional magnetic microstructures fabricated by microsterolithography," Applied Physics Letters, Jul. 2, 2008, pp. 262505-262505, vol. 92—No. 26, American Institute of Physics, Maryland/USA.

(Continued)

*Primary Examiner* — Stephen E Jones
*Assistant Examiner* — Scott S Outten
(74) *Attorney, Agent, or Firm* — Haynes and Boone, LLP

(57) ABSTRACT

Techniques are disclosed for systems and methods to provide a magnetic materials additive manufacturing system (MMAMS) configured to form compact magnetic structures and/or devices. A MMAMS includes a controller and one or more dispensers configured to dispense magnetic material matrix in a high resolution pattern in order to form the compact magnetic structures and/or devices. The MMAMS receives a magnetic device design including a magnetic structure to be formed from a magnetic material matrix, where the magnetic material matrix is configured to be used (Continued)

in the MMAMS. The MMAMS receives magnetic material matrix and dispenses the magnetic material matrix to form the magnetic structure.

6 Claims, 14 Drawing Sheets

(51) Int. Cl.

| | |
|---|---|
| H01P 1/18 | (2006.01) |
| H01P 1/32 | (2006.01) |
| B29C 47/06 | (2006.01) |
| B22F 3/00 | (2006.01) |
| B22F 3/105 | (2006.01) |
| C22C 33/02 | (2006.01) |
| H01F 41/00 | (2006.01) |
| H01P 3/06 | (2006.01) |
| H01P 11/00 | (2006.01) |
| B33Y 10/00 | (2015.01) |
| B33Y 70/00 | (2015.01) |
| B33Y 80/00 | (2015.01) |
| B29K 505/08 | (2006.01) |
| B29L 31/34 | (2006.01) |

(52) U.S. Cl.
CPC ....... *B29L 2031/3462* (2013.01); *B33Y 10/00* (2014.12); *B33Y 70/00* (2014.12); *B33Y 80/00* (2014.12)

(56) References Cited

OTHER PUBLICATIONS

Lopes et al., "Integrating stereolithography and direct print technologies for 3D structural electronics fabrication," Rapid Prototyping Journal, Mar. 2, 2012, pp. 129-143, vol. 18—No. 2, Emerald Group Publishing Limited, West Yorkshire, England.

Hui et al., "Photopatternable NdFeB polymer micromagnets for microfluidics and microrobotics applications," Journal of Micromechanics and Microengineering, Apr. 22, 2013, pp. 1-7, vol. 23—No. 6, IOP Publishing Ltd., Philadelphia, Pennsylvania/USA.

Lagorce et al., "Magnetic and Mechanical Properties of Micromachined Strontium Ferrite/Polyimide Composites," Journal of Microelectromechanical Systems, Dec. 1997, pp. 307-312, vol. 6, No. 4, IEEE, Piscataway/USA.

Chao et al., "Characterization of Micro-Structured Ferrite materials: Coarse and Fine Barium, and Photoresist Composites," IEEE Transactions on Magnetics, Jul. 2013, pp. 4319-4322, vol. 49, No. 7, IEEE, Piscataway/USA.

Sholiyi et al., "Electromagnetic properties of photodefinable barium ferrite polymer composites," AIP Advances, 2014, pp. 1-7, vol. 4, No, 077136, AIP Publishing, Melville/USA.

Sholiyi et al., "Electromagnetic characterization of strontium ferrite powders in series 2000, SU8 polymer," Materials Research Express, Oct. 22, 2014, pp. 1-16, vol. 1, No. 046107, IOP Publishing Ltd., Philadelphia/USA.

Sholiyi et al., "Microrectangular-Coaxial Phase Shifter for Microwave Devices," International Journal of RF and Microwave Computer-Aided Engineering, Jan. 29, 2015, pp. 1-8, Wiley Periodicals, Inc., Hoboken/USA.

Sholiyi, Olesegun Samuel, "Electromagnetic Characterization of Photo-Definable Ferrite Loaded Polymers and Their Applications in Micro-Rectangular Coaxial Phase Shifters," Dissertation, Oct. 2014, pp. i-xix & pp. 1-123, University of Alabama, Huntsville, Alabama/USA.

"ProtoFlux magnetic 3D printing filament launches on Kickstarter," 3Ders.org, Nov. 25, 2014, 9 pages, [online], [retrieved on Sep. 26, 2016]. Retrieved from the Internet: <http://www.3ders.org/articles/20141125-protoflux-magnetic-3d-printing-filament-launches-on-kickstarter.html>.

Krassenstein, Eddie, "Proto-Pasta Announces Stainless Steel and Magnetic Iron PLA Filament for 3D Printing," 3D Printing, Nov. 26, 2014, 14 pages, 3DR Holdings, LLC, [online], [retrieved on Sep. 26, 2016]. Retrieved from the Internet: <3dprint.com/27071/stainless-steel-iron-filament/>.

Halterman, Todd, "AM and 3D Printing Brought to Bear on Inverter and Electric motor Technology," 3D Printer World, Oct. 20, 2014, 3 pages, Punchbowl Media, [online], [retrieved on Sep. 26, 2016]. Retrieved from the Internet: <http://www.3dprinterworld.com/article/am-and-3d-printing-brought-bear-inverter-and-electric-motor-technology>.

\* cited by examiner

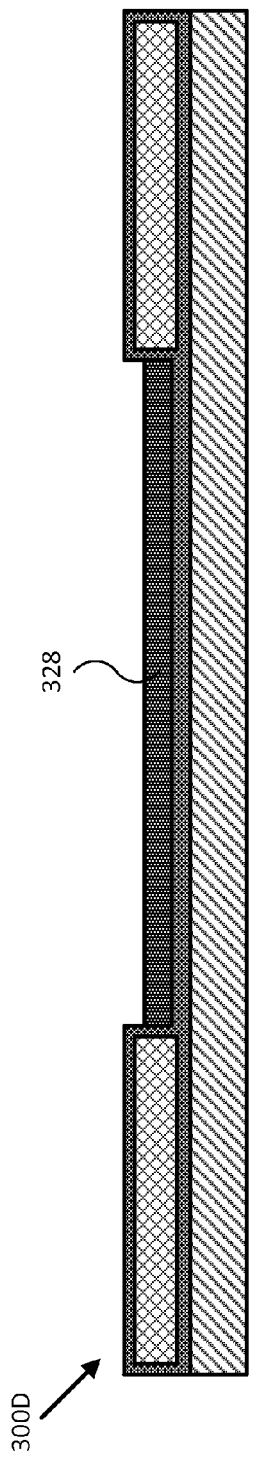
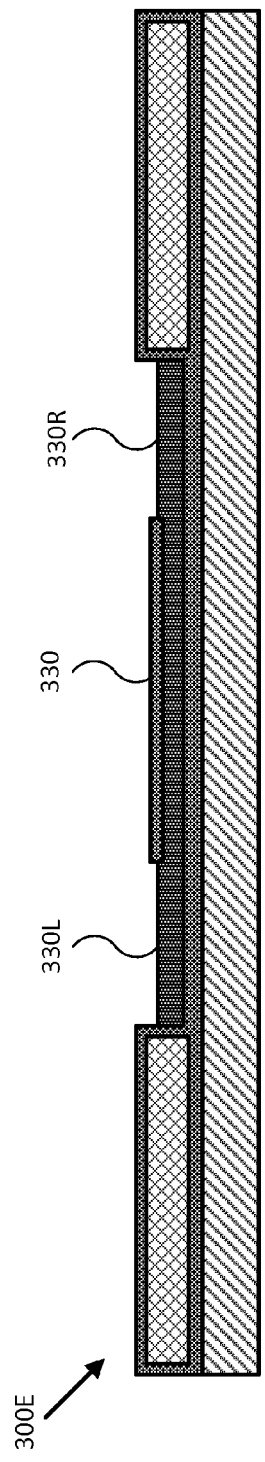
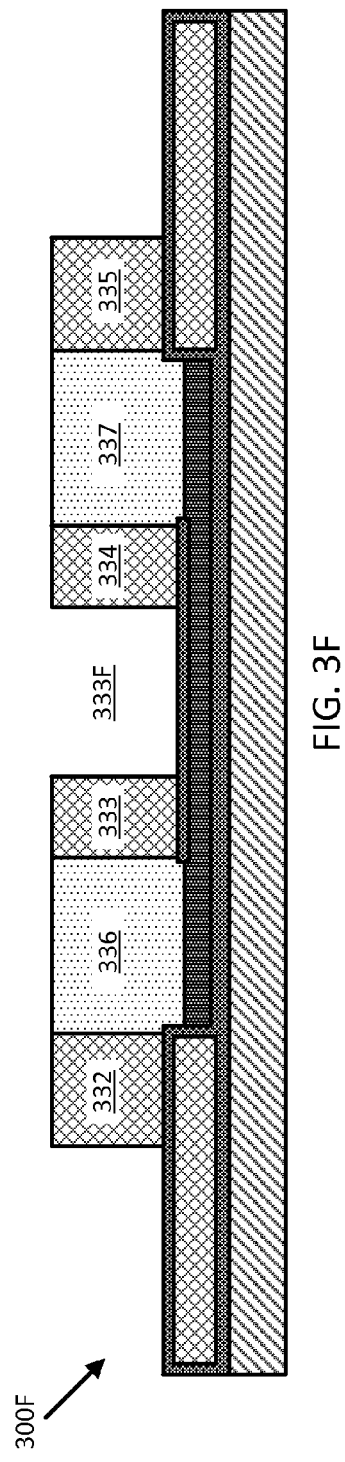

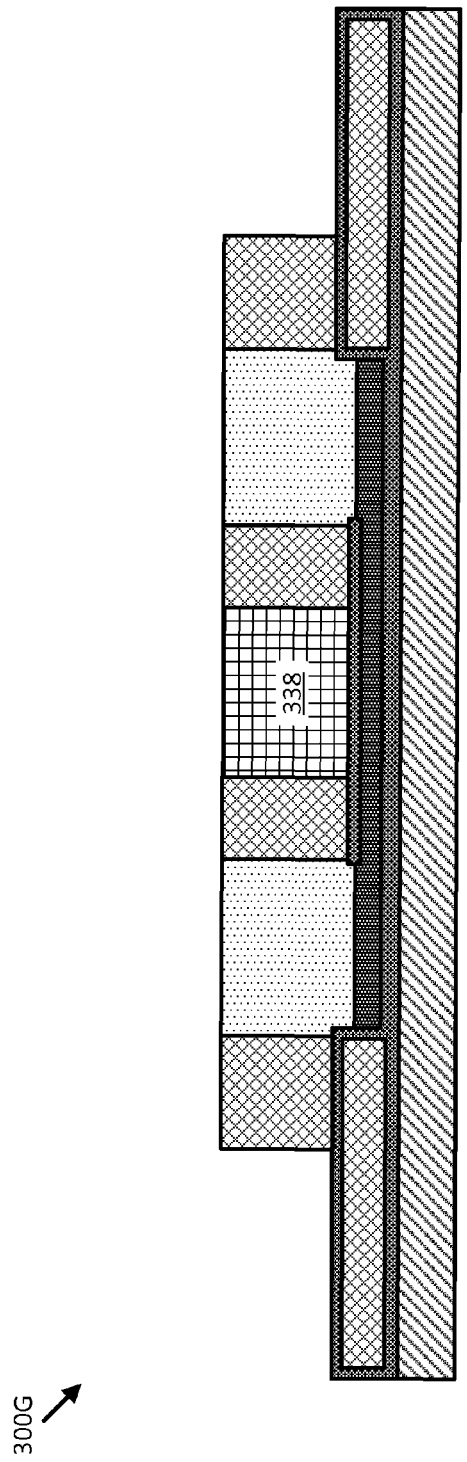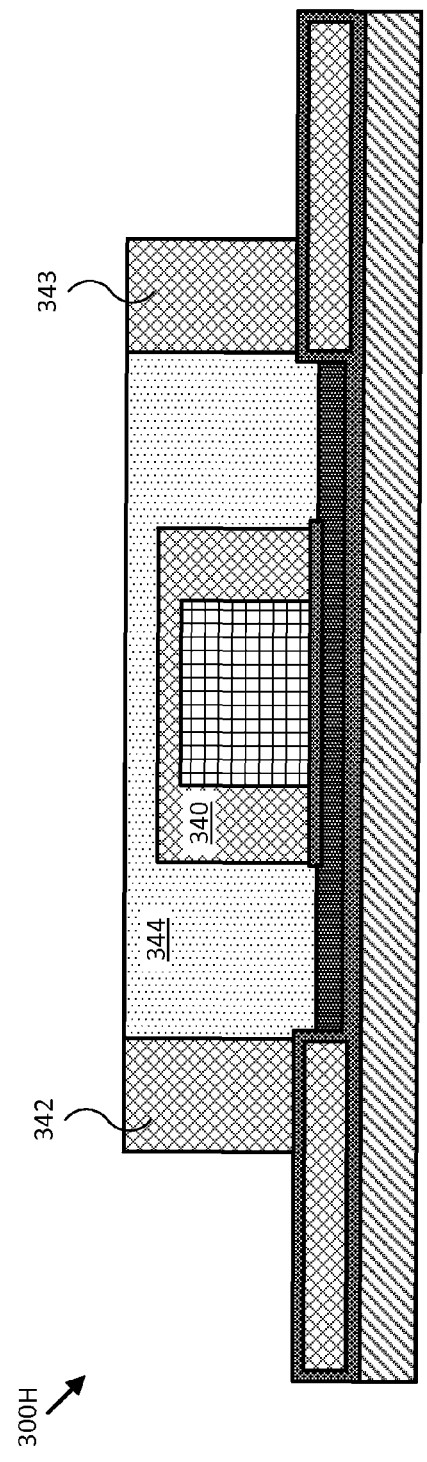

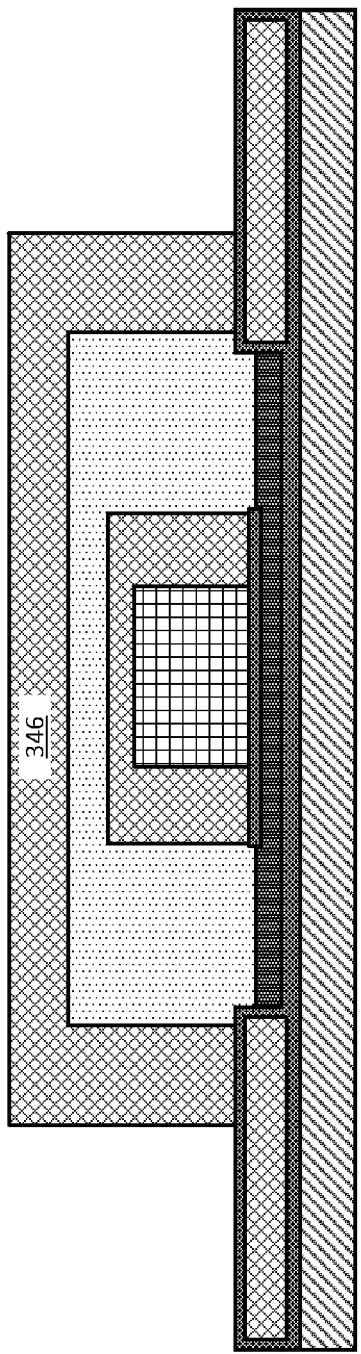
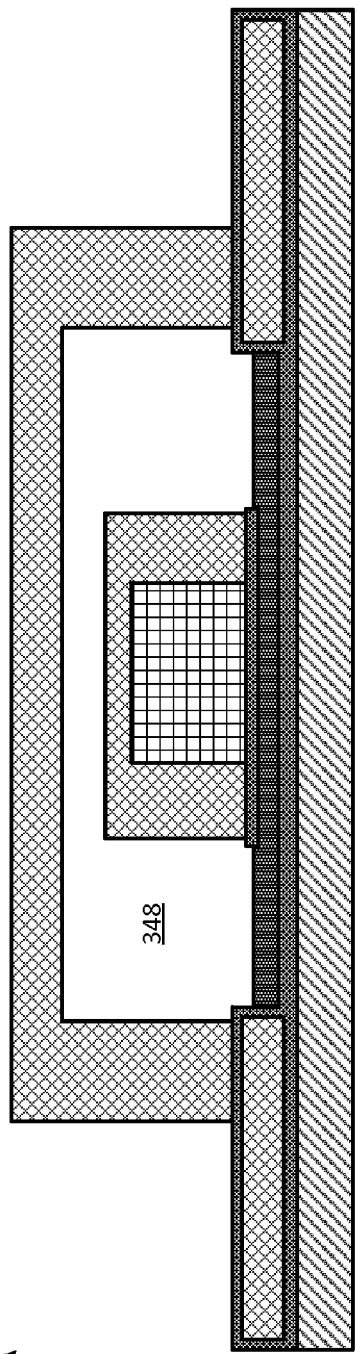
FIG. 3I
FIG. 3J

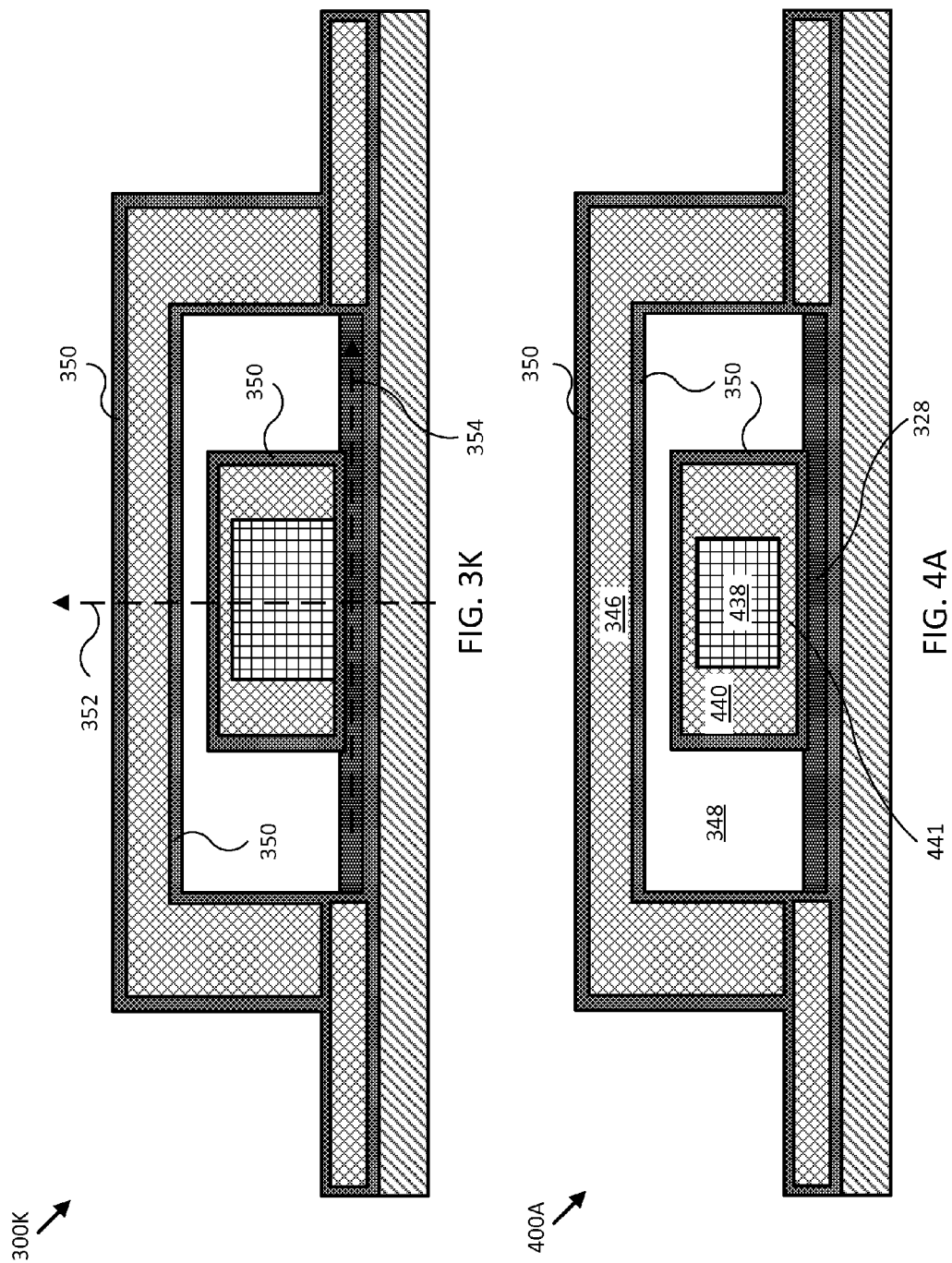

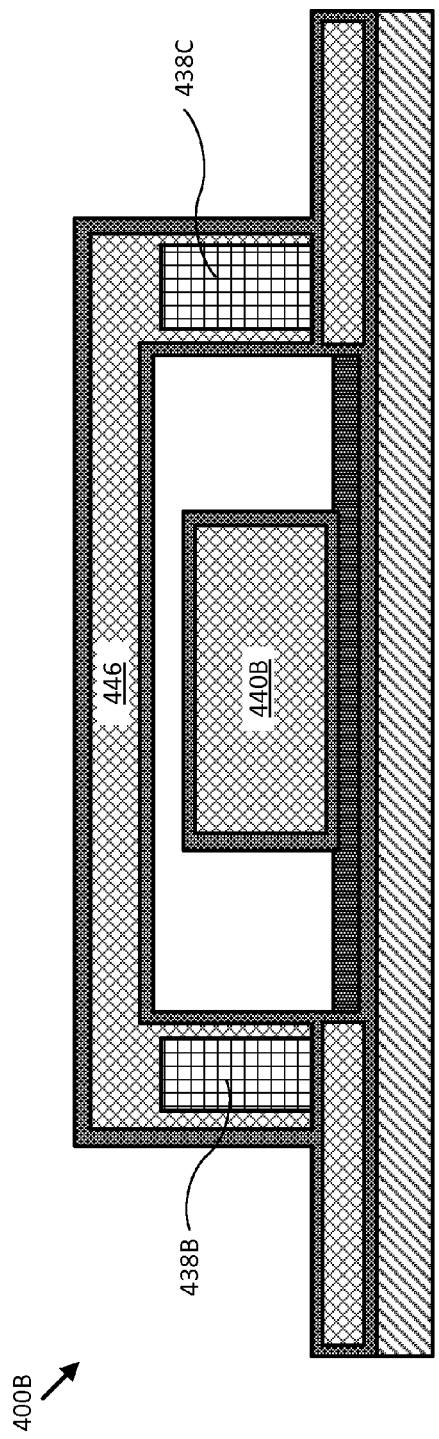
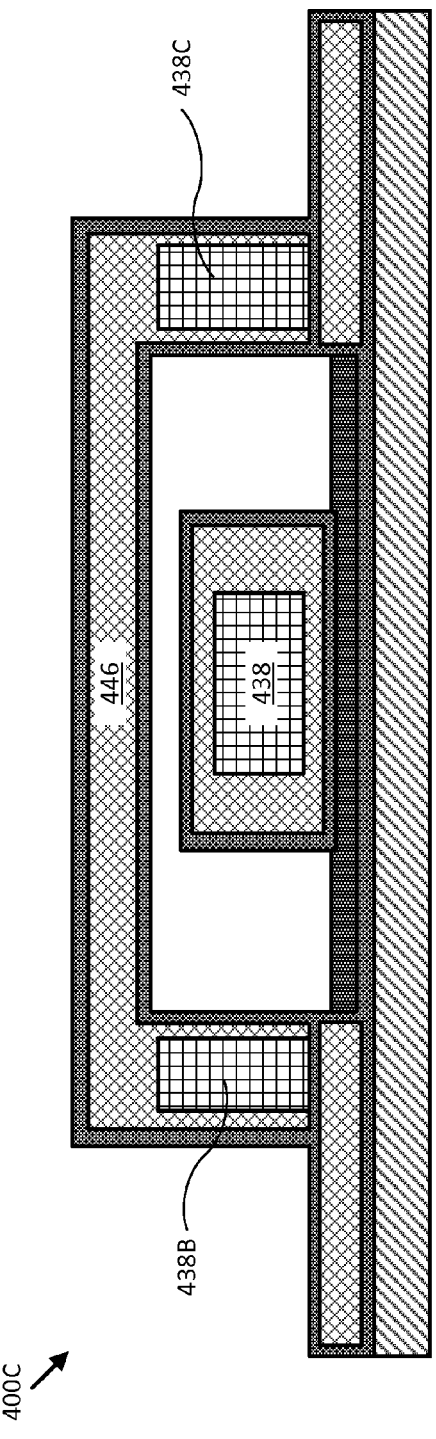

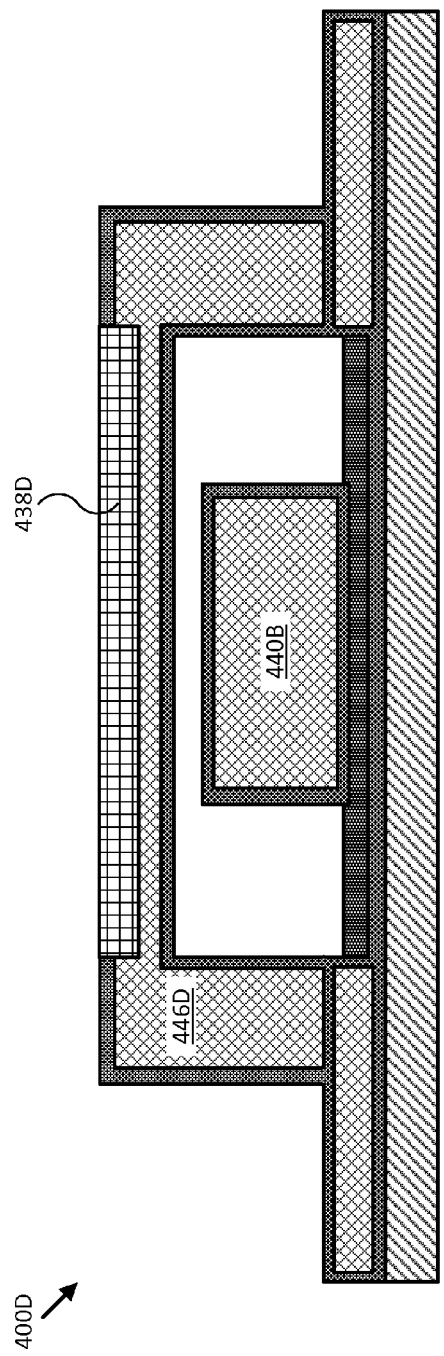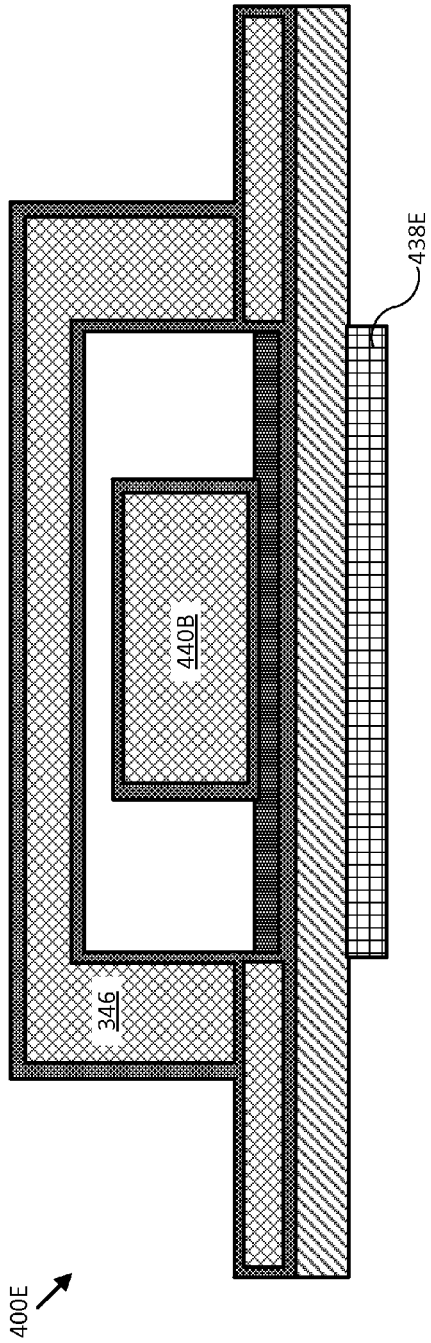

ADDITIVE MANUFACTURING SYSTEMS AND METHODS FOR MAGNETIC MATERIALS

CROSS REFERENCE TO RELATED APPLICATIONS

This patent application is related to patent application Ser. No. 14/831,815, filed Aug. 20, 2015 and entitled "Ferrite Composite Sleeve Systems and Methods for Coaxial Applications," which is hereby incorporated by reference in its entirety.

TECHNICAL FIELD

The present invention relates generally to additive manufacturing and, more particularly, to systems and methods for additive manufacture using magnetic materials.

BACKGROUND

Magnetic materials are used to form a wide array of electrical devices, such as motors, transformers, sensors, and/or other electronic devices. Contemporary devices are often miniaturized in order to form smaller or thinner devices, or, in the context of mobile applications, to reduce weight, reduce power, and/or otherwise add more functionality within a smaller footprint. Existing methods for forming relatively small magnetic devices typically include lithographic patterning or embossing using photoresist composites, mechanical polishing/placement, or electroplating.

Conventional electroforming can be used to plate metallic magnetic materials into lithographically patterned surfaces, and while the resolution of electroforming can be as low as 10's of nanometers, the technique cannot be used with substantially non-conductive ceramic permanent magnets or ferrite materials. Conventional lithography and embossing processes are also conventionally available, but these processes are limited in minimum resolution to approximately 40-60 um and require relatively complex multi-layer growth processes to produce the 2.5 dimensional shapes typical of lithographic processing. Thus, there is a need for an improved methodology to provide compact magnetic devices that is relatively inexpensive, takes less time, and is less complex.

SUMMARY

Techniques are disclosed for systems and methods to provide a magnetic materials additive manufacturing system configured to form compact magnetic structures and/or devices. A magnetic materials additive manufacturing system (MMAMS) may include a controller and one or more dispensers configured to dispense magnetic material matrix in a high resolution pattern in order to form the compact magnetic structures and/or devices. The MMAMS may be integrated with other AMSs and/or other fabrication systems and/or subsystems to form complex and compact electronic devices incorporating magnetic structures and/or devices, relatively quickly and inexpensively, as compared to conventional methods.

In one embodiment, a method may include receiving a magnetic device design including a magnetic structure to be formed from a magnetic material matrix, wherein the magnetic material matrix is configured to be used in a magnetic materials additive manufacturing system (MMAMS); receiving the magnetic material matrix by the MMAMS; and dispensing the magnetic material matrix using the MMAMS to form the magnetic structure.

In another embodiment, a system may include a transmission line coupled between a signal source and a signal sink, wherein the transmission line includes a center conductor separated from an outer conductor by at least one dielectric; the at least one dielectric includes a ferrite matrix dispensed by an MMAMS; and at least one of the center conductor and the outer conductor include a ferromagnetic matrix dispensed by the MMAMS and configured to provide a poling field to the ferrite matrix to modify an electromagnetic propagation characteristic of an electromagnetic wave while it propagates between the signal source and the signal sink.

In a further embodiment, a method may include receiving a signal of a signal source by a transmission line; propagating the signal between the signal source and a signal sink; and providing the signal to the signal sink by the transmission line, wherein the transmission line includes a center conductor separated from an outer conductor by at least one dielectric; the at least one dielectric includes a ferrite matrix dispensed by a magnetic materials additive manufacturing system (MMAMS); and the transmission line includes a ferromagnetic matrix dispensed by the MMAMS and configured to provide a poling field to the ferrite matrix to modify an electromagnetic propagation characteristic of the signal while it propagates between the signal source and the signal sink.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3A-K illustrate various fabrication stages of a magnetic device and/or structure in accordance with an embodiment of the disclosure.

FIGS. 4A-F illustrate various magnetic devices and/or structures formed in accordance with an embodiment of the disclosure.

Embodiments of the present disclosure and their advantages are best understood by referring to the detailed

DETAILED DESCRIPTION

In accordance with one or more embodiments of the present disclosure, a method for forming compact magnetic structures and/or devices includes using an additive manufacturing process to dispense magnetic material matrix in a high resolution pattern in order to form the compact magnetic structures and/or devices. In various embodiments, a magnetic materials additive manufacturing system (MMAMS) may include a controller and one or more dispensers (e.g., extruder nozzles, liquid dispensers, wire dispensers, and/or other magnetic material dispensers) configured to form a patterned magnetic structure and/or device on a build support. The MMAMS may be integrated with other AMSs and/or other fabrication systems and/or subsystems to form complex and compact electronic devices incorporating magnetic structures and/or devices, relatively quickly and inexpensively, as compared to conventional methods.

In various embodiments, the described technique directly writes magnetic materials into complex three dimensional shapes with design resolutions of approximately 10 um. The magnetic material may be placed (using electronic control) into desired one, two, or three dimensional patterns in minutes. In various embodiments, three dimensional shapes can be patterned by dispensing a highly viscous polymer and curing in place using heat, light, and/or other catalyst as it is printed, additive forming of pre-solidified magnetic composite filament (e.g., NdFeB mixed with a polymer) in free space, additively forming a nonmagnetic material alongside the magnetic material for mechanical support, and/or using other additive manufacturing techniques. The nonmagnetic material can be retained or dissolved away after the magnetic material is cured or dried. The result is a highly precise magnetic field pattern placed inside a polymer structure. Various portions of polymer within the overall device may include the magnetic material or may not include the magnetic material. Typically, the magnetic material will be only a small fraction of the total volume of the overall device, but the field generated by the incorporated magnetic material can be focused precisely onto the volumetric space required to drive an electromechanical, radio frequency, terahertz, or optical device. In cases where a liquid dispenser is used, limited heating may be applied, allowing the material to be isotropically magnetized prior to patterning. This means that one can create very complex magnetic shapes that may not otherwise be possible using lithographic patterning or embossing. Finished components can be magnetized using a conventional large area magnetizing tool or magnetic field generator, as described herein.

Figure 1:
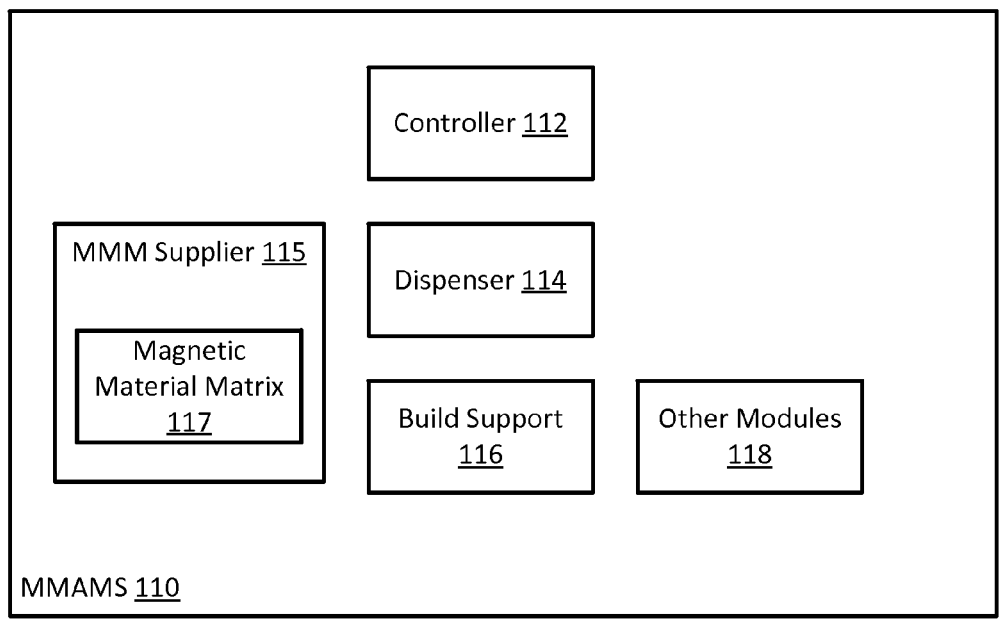
FIG. 1 illustrates a block diagram of a magnetic materials additive manufacturing system in accordance with an embodiment of the disclosure.

FIG. 1 illustrates a block diagram 100 of a magnetic materials additive manufacturing system (MMAMS) 110 in accordance with an embodiment of the disclosure. As shown in FIG. 1, MMAMS 110 includes a controller 112, a dispenser 114 configured to receive magnetic material matrix 117 from a supplier 115, and a build support 116. In various embodiments, controller 112 may be configured to control the various elements of system 110 to form one or more magnetic structures from magnetic material matrix 117 using an additive manufacturing process corresponding to MMAMS 110. For example, in embodiments where MMAMS 110 is implemented as a fused filament fabrication additive manufacturing system (FFFAMS), controller 112 may be configured to receive a design for a magnetic device (e.g., in the form of an electronic data file provided by an external logic device, such as a computer and/or memory device) and to dispense magnetic material matrix 117 (e.g., in the form of magnetic particle impregnated acrylonitrile butadiene styrene (ABS), polycarbonate (PC), polylactic acid (PLA), high density polyethylene (HDPE), PC/ABS, polyphenylsulfone (PPSU), high impact polystyrene (HIPS), and/or other polymer filament provided by supplier 115) to form a magnetic structure of the magnetic device from magnetic material matrix 117 using dispenser 114.

More generally, MMAMS may be implemented as an FFF AMS, a stereolithographic AMS (e.g., which may be configured to form solid magnetic structures from magnetic particle impregnated liquids using photopolymerization and/or other types of liquid curing processes), a wire or particle fusing AMS (e.g., which may be configured to form magnetic structures from magnetic wires and/or granules fused to one another using a laser, electron-beam, and/or other types of melting, sintering, and/or fusing device), and/or other types of AMSs that can be configured to form magnetic structures from magnetic material matrix 117 (e.g., magnetic particle impregnated filaments and/or liquids, magnetic granules or particles, and/or other magnetic material matrixes). In some embodiments, different types of AMSs, such as FFF and stereolithographic AMSs, may be combined into a single MMAMS that can be configured to form magnetic structures utilizing multiple different types of additive manufacturing processes.

Controller 112 may be implemented with any appropriate logic device (e.g., processing device, microcontroller, processor, application specific integrated circuit (ASIC), field programmable gate array (FPGA), memory storage device, memory reader, or other device or combinations of devices) or distributed combination of logic devices that may be adapted to execute, store, receive, and/or provide appropriate instructions, such as software instructions implementing a method and/or control loop for forming a magnetic structure, for example, using one or more elements of MMAMS 110. In addition, controller 112 may be implemented with one or more machine readable mediums configured to store non-transitory instructions and/or data files, such as design data files, for loading into and/or execution by controller 112. Such machine readable mediums may be internal, external, and/or otherwise configured to interface with controller 112. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), various types of universal serial bus (USB), and/or other interfaces).

Dispenser 114 may be implemented as an actuated or substantially stationary filament extrusion nozzle, liquid dispenser nozzle, print head, wire and/or granule placement device, and/or any other type of dispenser configured to receive magnetic material matrix 117 from supplier 115 and dispense magnetic material matrix 117 in a pattern, layer, or bulk liquid configured to form at least a portion of a magnetic structure supported by build support 116. For example, in embodiments where MMAMS 110 is at least partially implemented as an FFF AMS, dispenser 114 may include an actuated (e.g., using one or more stepper motors, for example) filament extrusion nozzle configured to receive magnetic matrix filament from a reel or spool of supplier 115 and heat, soften, and/or melt the magnetic matrix filament (e.g., using a heater integrated with dispenser 114) as it dispenses the magnetic matrix filament in one or more patterned layers to form a magnetic structure on build support 116.

In embodiments where MMAMS 110 is at least partially implemented as a stereolithographic AMS, dispenser 114 may include an actuated liquid dispenser nozzle configured to receive magnetic matrix liquid from a reservoir of supplier 115 and dispense the magnetic matrix liquid in one or more patterned layers to form a magnetic structure, for example, or dispense the magnetic matrix liquid into a pre-formed (e.g., using a different dispenser and/or AMS, and/or other types of fabrication systems) mould. In one or more embodiments, a nozzle of dispenser 114 may be implemented with substantially nonmagnetic materials, for example, to help reduce a risk of accumulation of magnetic material and/or blockage within dispenser 114. In some embodiments, the liquid dispenser nozzle may be implemented with a heater to help adjust a viscosity/flow rate of magnetic material matrix 117, for example, and/or to help adjust a magnetization of magnetic material matrix 117 as it is dispensed. In other embodiments, dispenser 114 may be configured to dispense bulk magnetic matrix liquid into a build reservoir of build support 116, for example, and one or more lasers and/or other curing devices (e.g., other modules 118) may be used to cure patterned layers of the bulk magnetic matrix liquid on build support 116 to form a magnetic structure.

In various embodiments, magnetic matrix filament, magnetic matrix liquid, and/or other magnetic material matrixes 117 may be cured after being dispensed by dispenser 114 by allowing the matrix to cool, by applying a catalyst such as heat, a chemical, a type of electromagnetic radiation (e.g., light), and/or other type of catalyst, and/or by applying other types of curing processes. In embodiments where MMAMS 110 is at least partially implemented as a wire or particle fusing AMS, dispenser 114 may include an actuated wire or particle dispenser nozzle configured to receive magnetic wire or magnetic particles from supplier 115 and dispense the wire or particles in one or more patterned layers, which may then be melted, sintered, or otherwise fused to each other and/or prior-formed layers to form a magnetic structure. Such fusing may be performed using a laser, an electron beam, and/or other type of fusing device (e.g., other modules 118).

Build support 116 may be implemented as a mechanically actuated platform, such as for an FFF AMS, for example, or may be implemented as a mechanically actuated reservoir and/or platform, where the reservoir may be configured to contain bulk liquid magnetic matrix, and where the platform and/or reservoir may be configured to separate to lift a magnetic structure out from the reservoir as the magnetic structure is formed coupled to the platform. In some embodiments, build support 116 may be actuated so as to move relative to dispenser 114 to facilitate formation of a magnetic structure. In one embodiment, dispenser 114 may be substantially stationary throughout a manufacturing process, for example, and build support 116 may be configured to move and/or rotate relative to dispenser 114 to help form a magnetic structure. Build support 116 may also be implemented with one or more features configured to facilitate a type of additive manufacturing process, such as a platform temperature controller (e.g., a heater or cooler) or a device or vacuum chuck (e.g., configured to help keep a partially or completely formed magnetic structure or device stationary relative to build support 116 during formation).

In various embodiments, other modules 118 may include one or more devices configured to facilitate a type of additive manufacturing process performed by MMAMS 110. For example, other modules 118 may include a curing, melting, sintering, or fusing laser and/or electron beam device, a pattern projector, a temperature sensor (e.g., configured to monitor a temperature of dispenser 114, build support 116, an ambient temperature of MMAMS 110, and/or other process temperatures associated with operation of MMAMS 110), a magnetic field generator, a demagnetizer, a device or vacuum chuck (e.g., on which to mount or form a magnetic structure, a magnetic device, a mould, and/or other structure), a transport mechanism (e.g., configured to mechanically transport a magnetic structure, build support 116, and/or a device or vacuum chuck to and from MMAMS 110), an alignment sensor (e.g., configured to sense a position of dispenser 114, build support 116, and/or portions of a magnetic structure or device supported by build support 116), one or more actuators configured to position elements of MMAMS 110 (e.g., including elements of other modules 118), one or more heaters (e.g., to adjust a temperature of dispenser 114, build support 116, an ambient temperature of MMAMS 110, and/or other elements of MMAMS 110), and/or other devices.

In some embodiments, various devices of other modules 118 may be integrated with other elements of MMAMS 110 to help facilitate forming a magnetic structure and/or device. For example, a heater and/or temperature sensor of other modules 118 may be integrated with dispenser 114 and/or build support 116 and/or coupled to controller 112 to help control or maintain a particular temperature at dispenser 114 and/or build support 116. In other embodiments, a heater, a magnetic field generator (e.g., an adjustable current supply coupled to a Helmholtz coil or other electromagnet coil configuration, with or without an adjustable orientation relative to build support 116), a demagnetizer (e.g., a magnetic field generator with an adjustable alternating current supply), and/or other magnetism adjustment device may be integrated with dispenser 114 and/or build support 116 to help adjust a magnetic property of a magnetic structure formed by MMAMS 110. Such magnetic adjustment devices may be configured to make such adjustments in situ relative to the additive manufacturing process performed by MMAMS 110, for example, or ex situ, such that magnetic adjustment would take place at intermediate steps in or after completion of the formation of a magnetic structure.

In one embodiment, dispenser 114, build support 116, and/or other elements of MMAMS 110 may be implemented with a magnetic field generator configured to guide magnetic particles and/or powder (e.g., in bulk or within a liquid) to a particular position on build support 116, such as within a preformed mould. In general, MMAMS 110 may be implemented with multiple dispensers 114 and/or suppliers 115 to allow formation of magnetic structures and/or devices using multiple types of materials, including magnetic material matrixes 117 and/or nonmagnetic materials (e.g., used to form nonmagnetic structure, such as mechanical supports and/or moulds, for a magnetic device).

Various embodiments of MMAMS 110 may be used to form magnetic structures with reliable dimension resolutions of approximately 10 to 20 um. For example, where MMAMS 110 is at least partially implemented as an FFF AMS and/or a stereolithographic AMS, utilizing a magnetic particle impregnated polymer liquid and/or filament, MMAMS 110 may be configured to form one or more magnetic structures with dimension resolutions as small as approximately 10 or 20 um, for example, while maintaining approximately 50% of the magnetic properties/effects of bulk (e.g., machined and/or shaped) magnetic counterparts.

Thus, embodiments of MMAMS 110 may be configured to form magnetic structures configured for mechanical, electrical, and/or radio frequency applications in extremely compact spaces, relative to conventional methods. Moreover, due in part to the resolution attainable by embodiments of MMAMS 110 and/or the spatial flexibility offered by additive manufacturing using magnetic material matrixes, as opposed to conventional machining, lapping, photolithography, or other conventional shaping of magnetic structures, magnetic structures formed using embodiments described herein may be configured to generate extremely complex and compact three dimensional magnetic fields and/or gradients.

Figure 2:
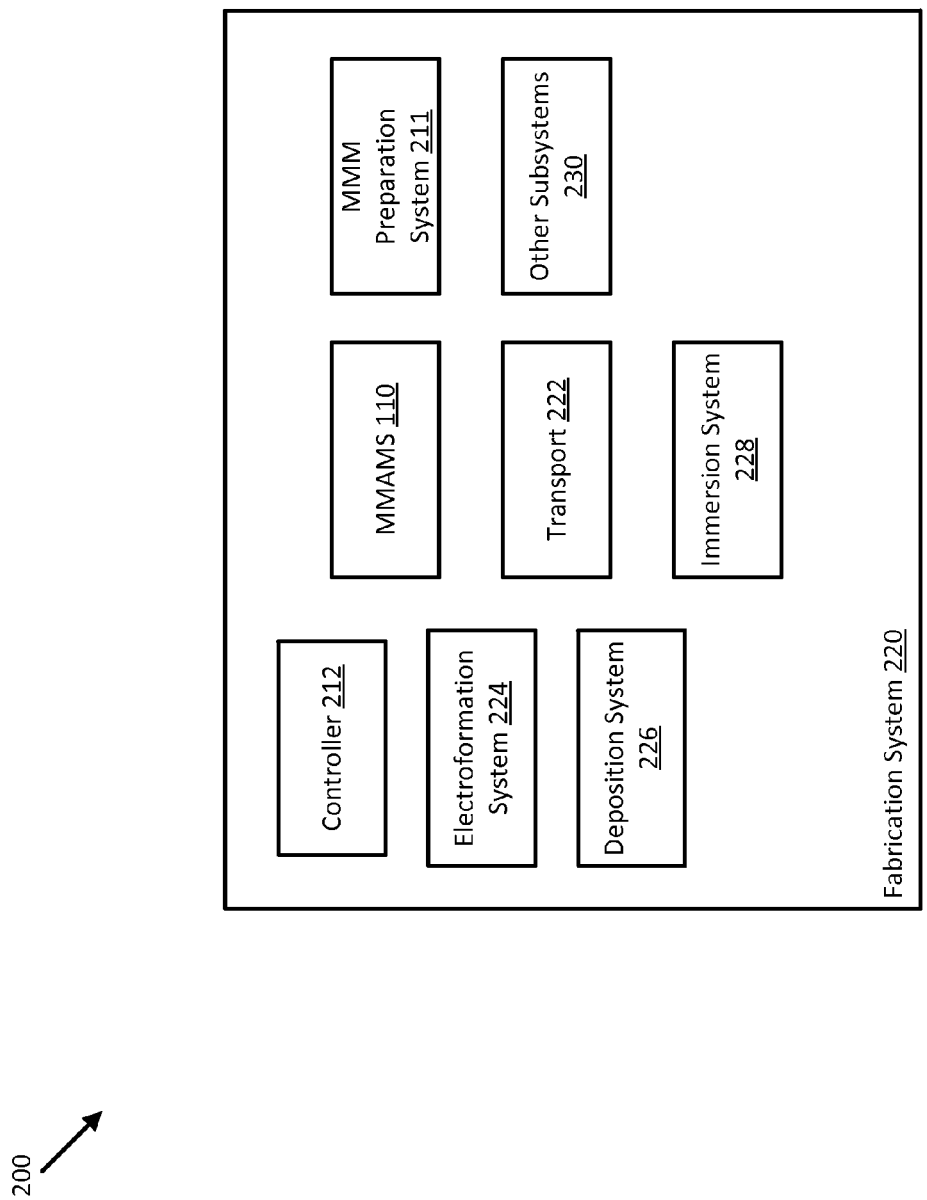
FIG. 2 illustrates a block diagram of a fabrication system including a magnetic materials additive manufacturing system in accordance with an embodiment of the disclosure.

FIG. 2 illustrates a block diagram 200 of a fabrication system 220 including MMAMS 110 in accordance with an embodiment of the disclosure. For example, fabrication system 220 may be configured to use multiple different types of fabrication processes to help form a monolithic device integrated with one or more magnetic structures and/or devices formed by MMAMS 110. As shown in FIG. 2, fabrication system 120 may include electroformation system 224, deposition system 226, immersion system 228, and one or more other subsystems 230, each able to help process a magnetic device and/or structure formed, at least in part, by MMAMS 110. In various embodiments, a magnetic device and/or other structure in various stages of manufacture may be conveyed between elements of fabrication system 220 by transport 222, which may be implemented as a device or vacuum chuck conveyance system, for example, and/or other transport configured to retrieve a magnetic device and/or other structure from any element of fabrication system 220 and deliver the device or structure to another element of fabrication system 220. In some embodiments, transport 222 may be implemented, at least in part, by a user conveying a device or structure between elements of fabrication system 220. Operation of transport 222 and/or other elements of fabrication system 220 may be controlled and/or otherwise facilitated by controller 212, which may be implemented as one or more monolithic or distributed logic devices similar to controller 112 of FIG. 1, for example, that may be configured to communicate with any element of fabrication system 120 to operate fabrication system 220.

In the embodiment shown in FIG. 2, fabrication system 220 includes preparation system 211, which may be configured to prepare magnetic material matrix for use with MMAMS 110 and/or to deliver magnetic material matrix to MMAMS 110 (e.g., to supplier 115 of MMAMS 110, as shown in FIG. 1). In some embodiments, preparation system 211 may be configured to mix a magnetic powder with a liquid polymer resin to provide a bulk liquid magnetic matrix. Preparation system 211 may be configured to provide that bulk liquid magnetic matrix directly to MMAMS 110, for example, or to solidify/cure the liquid magnetic matrix to form bulk solid magnetic matrix and then form/extrude it into filament, wire, and/or laminate, which can be provided to MMAMS 110 as a base magnetic material matrix from which to form a magnetic structure using a corresponding type of additive manufacturing process, as described herein. In other embodiments, preparation system 211 may be configured to extrude and/or spool a magnetic wire (e.g., from bulk magnetic material and/or wire), or to package magnetic granules, particles, and/or powder, for example, to provide magnetic material matrix to MMAMS 110 that is suitable for fusing.

Possible ingredients for a magnetic material matrix include, without limitation, various types and/or arrangements of ferromagnetic and/or ferrimagnetic materials, hard and/or soft magnetic materials, bulk ferrite or ferromagnetic materials, ferrite and/or ferromagnetic powders (e.g., with grain sizes between approximately 0.8 to 6 um), nonconductive ceramic magnetic materials, Barium Hexaferrite ($BaFe_{12}O_{19}$), various other hexagonal ferrites, Neodymium ($Nd_2Fe_{14}B$) permanent magnets, soft nickel-iron alloy (NiFe), various other permanent magnet materials, SU8 photoresist, other photoresist polymers, ABS, PC, PLA, HDPE, ultra HDPE, PC/ABS, PPSU, HIPS, thermoplastic polymers, light sensitive stereolithography photo-resin, and/or other liquid and/or melt-able polymers. When mixing powders and polymers, mixing can commence at various mass ratios, such as 1:1, 3:1, and/or across the range of 0.5:1 to more than 5:1 (e.g., mass of powder:mass of polymer). Also, some magnetic material matrix may include a chemical additive to reduce differences in the interfacial surface energy of constituent materials. For example, in one embodiment, a relatively small amount (e.g., 5 mL of additive per L of polymer/resist) of ethyl acetate and 1-cyano-ethyl-2theyl-4 methylimidazole may be added to SU8 when mixing with Barium Hexaferrite powder to help ensure relatively homogenous mixing. In various embodiments, mixing may be performed by a nonmagnetic stirring device.

As is known in the art, ferromagnetic materials may be characterized as including aligned magnetic domains that produce relatively strong net magnetic fields, whereas ferrimagnetic materials may be characterized as including opposed magnetic domains, as with antiferromagnetic materials, but with an anisotropy in the moments of the opposing magnetic domains such that a net or aggregate magnetic moment remains. The net magnetic moment can be selectively aligned relative to a propagating electromagnetic field (e.g., using an externally applied magnetic polling field, which may be provided by a ferromagnetic material for example) to modify various propagation characteristics of the propagating electromagnetic field, as described more fully herein.

Electroformation system 224 may be implemented as any electrodeposition, electroplating, and/or other type of electroforming system that can be configured to form a metal layer of a selectable thickness on a conductive surface, such as a patterned conductive surface. For example, electroformation system 224 may be configured to form a layer of an electroformable metal that is one micrometer thick or thicker over any exposed conductive surface of a partially formed magnetic structure and/or device, and/or to form a relatively thick substrate on which to form a magnetic structure and/or device. In various embodiments, the exposed conductive surface may be selective exposed by an electroformation mask, such as patterned photoresist. Deposition system 226 may be implemented as any sputter deposition system and/or other type of film deposition system that can be configured to form a patterned material layer of a selectable thickness on a substrate. For example, using a deposition mask, deposition system 226 may be configured to form a layer of a metal material that is less than one micrometer thick or thicker, such as a metal seed layer, over a portion of a partially formed magnetic structure and/or device that is exposed by the deposition mask. Such exposed portions may include conductive and/or nonconductive surfaces.

Immersion system 228 may be implemented as any etching, cleaning, filling, and/or other type of chemical immersion system that can be configured to partially or completely immerse and/or spray an object to chemically etch, clean, dissolve, fill, or otherwise process the object. For example, immersion system 228 may be configured to dissolve nonmagnetic polymer or resin and/or other nonmagnetic structure within a partially formed magnetic structure and/or device to remove unwanted portions (e.g., fabrication supports or moulds, for example) of the partially formed magnetic structure or device. In some embodiments, immersion system 228 may be configured to immerse a partially formed magnetic structure or device to fill one or more cavities within the magnetic structure or device with a particular type of material, such as a dielectric material, for example, or other magnetic or nonmagnetic material in solution form, which can then be cured to form a portion of the magnetic structure and/or device. In various embodiments, immersion system 228 may be used with an immersion mask to select portions of a magnetic structure and/or device to etch, clean, dissolve, or fill a magnetic structure and/or device. In some embodiments, immersion system 228 may be implemented with a heater, lamp, and/or other type of curing device to help dry or cure a magnetic structure and/or device.

In various embodiments, other subsystems 230 may include one or more devices configured to facilitate a fabrication process performed by fabrication system 220. For example, other subsystems 230 may include various types of nonmagnetic AMSs, material supply and/or preparation systems, a curing, melting, sintering, or fusing laser and/or electron beam device, a pattern projector, a temperature sensor (e.g., configured to monitor process temperatures associated with operation of fabrication system 220), a magnetic field generator, a demagnetizer, a device or vacuum chuck, an alignment sensor (e.g., configured to sense a position and/or orientation of a magnetic structure or device partially or fully fabricated by fabrication system 220), one or more actuators configured to position elements of fabrication system 220 (e.g., including elements of other subsystems 230), one or more heaters (e.g., to adjust a temperature of elements of fabrication system 220), and/or other devices. In some embodiments, other subsystems 230 may include a pic and place machine configured to place integrated circuits and/or other circuit elements on a substrate, such as a printed circuit board (PCB), to integrate such circuit elements with a magnetic structure and/or device provided, at least in part, by MMAMS 110, onto the substrate.

In some embodiments, various devices of other subsystems 230 may be integrated with other elements of fabrication system 220 to help facilitate forming a magnetic structure and/or device. For example, a heater and/or temperature sensor of other subsystems 230 may be integrated with electroformation system 224 and/or immersion system 228 and/or coupled to controller 212 to help control or maintain a particular temperature at electroformation system 224 and/or immersion system 228. In other embodiments, a heater, a magnetic field generator, a demagnetizer, and/or other magnetism adjustment device may be integrated with any element of fabrication system 220 to help adjust a magnetic property of a magnetic structure and/or device formed by fabrication system 220.

By integrating MMAMS 110 with fabrication system 220, embodiments of the present disclosure may be configured to provide electronic devices with integrated magnetic structures having reliable dimension resolutions of 10-20 um. Moreover, due in part to the relatively fine dimension resolution and/or the spatial flexibility offered by additive manufacturing using magnetic material matrixes, electronic devices including integrated magnetic structures formed using the processes and/or systems described herein may be configured to function under and/or benefit from extremely complex and compact three dimensional magnetic fields and/or gradients, as described herein.

One magnetic device that can take advantage of the manufacturing capabilities of MMAMS 110 and/or fabrication system 220 is a transmission line for electromagnetic waves (e.g., electrical and/or optical propagating waves). To explain, ferrite materials can be useful to modify propagation characteristics of electromagnetic waves, and magnetic poling is typically required for microwave or higher frequency applications involving ferrite materials. Conventional poling methods typically rely on relatively large (size and field strength) external magnets and/or inductors to polarize machine polished (e.g., relatively large) ferrite blocks. The size of the external magnet is typically at least a few mm across in each of the three principal dimensional axes. Ferrite matrixes by themselves allow for much smaller features sizes and tighter positional tolerances, but conventional methods for interacting with ferrites involve surrounding a transmission line/waveguide with the relatively large external magnets. The strength of the poling field required for the ferrite material depends on the type of ferrite material and the application. The field strength supplied by the external magnet depends on its physical distance from the ferrite material and, in some embodiments, the number of magnetic poles focusing it onto the ferrite. In many applications, geometrical restrictions require external magnets to be placed hundreds of microns or more from the ferrite. Under such conditions, strong magnets must be used, which can interfere with other electronic components and lead to increased design complexity and lower overall product performance.

Embodiments of the present disclosure allow the poling magnet to be placed within a few microns of the ferrite. By incorporating the magnet directly into the transmission line/waveguide, the magnetic field is essentially focused directly through the ferrite. Such arrangements reduce the need for 1 Tesla magnets to be used because most ferrites only require a 0.2-0.5 Tesla applied field in order to become sufficiently polarized to have an effect on a local propagating electromagnetic wave. By providing the reduced field requirements and the general decrease in size of the magnet, embodiments of the present disclosure reduce the amount of magnetic field interactions present in electronic devices incorporating a conforming magnetic structure or device.

For example, a ferromagnetic material coated with a nonmagnetic conductor may be used as the inner and/or outer conductor of a coaxial transmission line. Ferrite material may be placed inside the dielectric between the inner and outer conductors. External magnetic fields may be applied as needed to magnetize the ferromagnetic material (e.g., in a particular direction relative to an expected propagation direction of an electromagnetic wave or other type of signal). The nonmagnetic conductor covering the ferromagnetic material prevents electromagnetic coupling of the magnetic field to the incident electromagnetic wave in nonmagnetic dielectrics. However, the ferrite material (e.g., a magnetic dielectric) becomes polarized by the ferromagnetic material within the nonmagnetic conductor. This causes ferrite polarization of the electromagnetic field over the entire dielectric region. The result is a reciprocal or nonreciprocal phase shift of the electromagnetic wave propagating down the transmission line, and similar structures can be used to form a number of different devices configured to modify how the electromagnetic wave propagates through the coaxial transmission line/waveguide.

Embodiments of the present disclosure provide a highly compact methodology to incorporate magnetic elements into electromagnetic filters, transmission lines, and couplers for increased radio frequency performance. The dimensions of the magnetic structures described herein can be patterned from relatively large cm sizes down to approximately 10 um. The field strength of a hard ferromagnet used for macro-scale applications can be greater than 1 Tesla, but the field strength of a hard ferromagnet matrix patterned to 10 um in size can be between 0.2 and 0.5 Tesla. Soft ferromagnets demonstrate magnetic field strengths between 0.4 and 1.75 Tesla. The compact nature of the described fabrication processes allows embodiments to achieve nearly ideal magnetic coupling between magnetic structures integrated into a magnetic device, which helps compensate for any loss in field strength resulting from use of an additive manufacturing process, as described herein.

FIGS. 3A-K illustrate magnetic devices 300A-300K corresponding to various fabrication stages for a magnetic device and/or structure (e.g., the final form of which may correspond to magnetic device 300K) in accordance with an embodiment of the disclosure.

In particular, magnetic devices 300A-300K may correspond to a transmission line for electromagnetic waves including one or more magnetic structures configured to modify propagation of the electromagnetic waves within the transmission line. For example, magnetic devices 300A-300K may correspond to or form part of a true delay line, a ferrite core transformer, a coupler, an isolator, a circulator, a ferrite phase shifter, a nonreciprocal delay line, a ferromagnetic phase shifter/delay line, ultra small (e.g., approximately between 10-20 um diameter, preferably 10 um) magnets for relay switches, micro Halbach array magnets for nuclear magnetic resonance (NMR) and/or scanning electron microcopy (SEM) instrument design, and/or other substantially passive electromagnetic wave propagation modification/adjustment device, in the form of a rectangular or square (e.g., where squares are a subset of the set of rectangles) coaxial transmission line (e.g., a micro-coax transmission line) and/or waveguide including one or more magnetic structures formed by an additive manufacturing process, as described herein. Fabrication sequences described herein may be monolithically integrated and can be batch fabricated with an expected completion time between a few hours to one or two days, which is a substantial decrease in overall fabrication time.

Figure 3A:
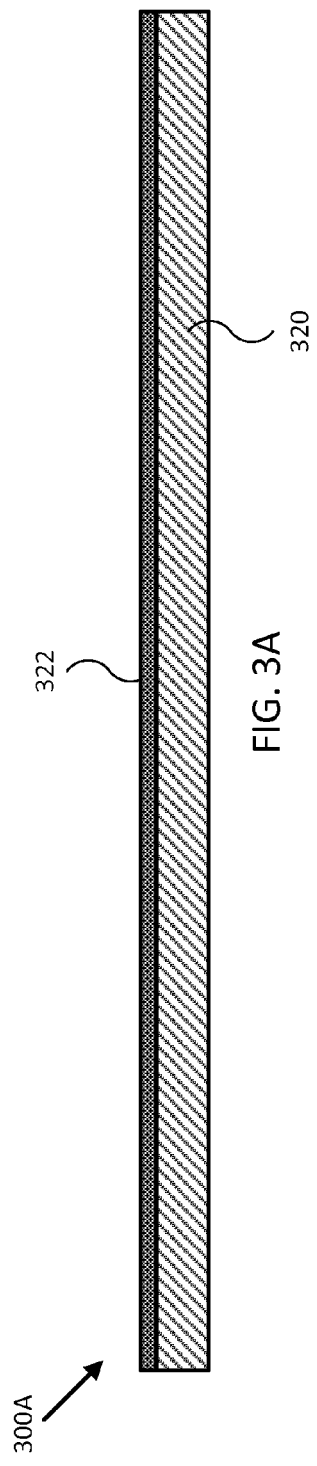

FIG. 3A illustrates a first fabrication stage of magnetic device 300K. As shown in the embodiment provided by FIG. 3A, magnetic device 300A includes a copper layer 322 formed on a radio frequency (RF) dielectric board (e.g., a PCB) 320. In some embodiments, copper layer 322 may be one mil thick, so as to form a relatively robust conductive substrate on which to form magnetic device 300K and/or place other elements of a constituent electronic device. RF dielectric board 320 may be purchased with a preformed copper layer 322, for example, or a combination of deposition system 226 and/or electroformation system 224 of fabrication system 224 may be used to form copper layer 322 on a supplied bare RF dielectric board 320.

Figure 3B:
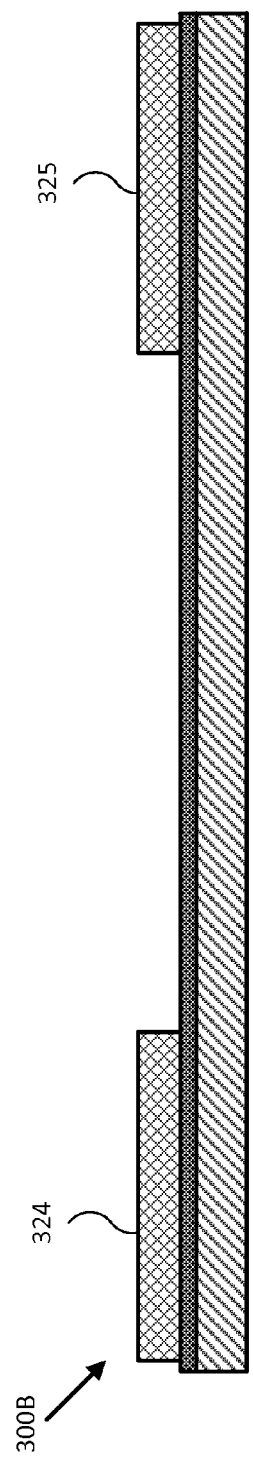

In FIG. 3B, a conductive polymer may be formed on copper layer 322 to form left and right conductive polymer mesas 324 and 325 of magnetic device 300B. For example, left and right conductive polymer mesas 324 and 325 may be formed on copper layer 322 using an AMS (e.g., an element of other subsystems 230 similar to MMAMS 110) configured to use a conductive polymer to form left and right conductive polymer mesas 324 and 325. Such conductive polymer may be implemented as an ABS or other plastic or polymer impregnated with conductive particles (e.g., nanoparticles) sufficient to allow metal layers to be plated (e.g., electroplated) onto left and right conductive polymer mesas 324 and 325 after they are formed. In various embodiments, the conductive particles are substantially nonmagnetic. For example, in one embodiment, the ABS formulation may be referred to as laser direct structuring (LDS) platable ABS material. In some embodiments, left and right conductive polymer mesas 324 and 325 may be approximately 40 um thick and wide enough to support the remaining fabrication steps for magnetic device 300K. More generally, the thickness of left and right conductive polymer mesas 324 and 325 may be selected in relation to a thickness of ferrite matrix 328 and/or other substantially nonconductive material formed between left and right conductive polymer mesas 324 and 325 so to facilitate the formation of an outer conductor for magnetic device 300K, for example.

Figure 3C:
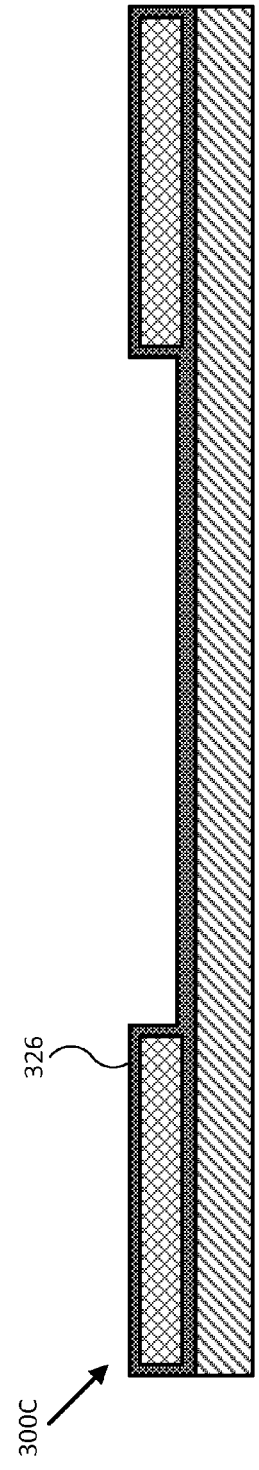

In FIG. 3C, a copper film 326 may be formed on left and right conductive polymer mesas 324 and 325 and copper layer 322 to form magnetic device 300C. For example, copper film 326 may be formed on left and right conductive polymer mesas 324 and 325 and copper layer 322 using electroformation system 224 (e.g., to form, at least in part, a metallic surface layer for a center conductor 340 and/or outer conductor 346, as described more fully with respect to FIGS. 3H and 3I). In some embodiments, copper film 326 may be approximately 10 um thick.

In FIG. 3D, a ferrite matrix 328 may be formed between left and right conductive polymer mesas 324 and 325 and on copper film 326 to form magnetic device 300D. For example, ferrite matrix 328 may be formed using MMAMS 110. In some embodiments, MMAMS 110 may be implemented with an FFF AMS, for example, and ferrite matrix 328 may include ferrite (e.g., ferrimagnetic) powder impregnated filament polymer (e.g., Barium Hexaferrite powder impregnated filament ABS) prepared by preparation system 211, for example, and provided to supplier 115 of MMAMS 110. In other embodiments, MMAMS 110 may be implemented with a stereolithographic AMS, for example, and ferrite matrix 328 may include ferrite powder impregnated liquid polymer mixed together or otherwise prepared by preparation system 211, for example, and provided to supplier 115 of MMAMS 110. In various embodiments, ferrite matrix 328 may be between approximately 10 urn and 40 um thick and substantially fill the surface between left and right conductive polymer mesas 324 and 325. Further, ferrite matrix 328 may be substantially dielectric, based on the material selection of the ferrite powder and the polymer. A cured or otherwise solidified ferrite matrix 328 may also be referred to as a ferrite structure or ferrimagnet.

In FIG. 3E, a copper seed layer 330 may be formed on ferrite matrix 328 to form magnetic device 300E. For example, copper seed layer 330 may be formed using deposition system 226 and a deposition mask. In some embodiments, copper seed layer 330 may be approximately 10 um thick and wide enough to support the remaining fabrication steps for magnetic device 300K, including leaving left and right portions 330L and 330R of ferrite matrix 328, which are adjacent to left and right conductive polymer mesas 324 and 325, uncovered by any conductive layer.

In FIG. 3F, conductive polymer walls 332-335 may be formed on copper film 326 over left and right conductive polymer mesas 324 and 325, and dissolvable polymer fillers 336-337 may be formed on left and right portions 330L and 330R of ferrite matrix 328 to form magnetic device 300F. For example, conductive polymer walls 332-335 and/or dissolvable polymer fillers 336-337 may be formed using an AMS (e.g., other subsystems 230) configured to use ABS conductive polymer (as in FIG. 3B) and/or dissolvable polymer, accordingly, to form center cavity 333F. In some embodiments, conductive polymer walls 332-335 and dissolvable polymer fillers 336-337 may be formed to be approximately 125 um thick and wide enough to support the remaining fabrication steps for magnetic device 300K, including dissolvable polymer fillers 336-337 each being wide enough to completely cover left and right portions 330L and 330R of ferrite matrix 328 and, in some embodiments, additional portions of copper film 326 and copper seed layer 330 (e.g., approximately 1, 5, or 10 um portions) adjoining left and right portions 330L and 330R, to help ensure conductive polymer walls 332-335 do not directly contact ferrite matrix 328. In general, conductive polymer walls 332-335 and/or dissolvable polymer fillers 336-337 may be formed with any thickness sufficient to provide structural support for the remaining fabrication steps for magnetic device 300K.

In various embodiments, inner conductive polymer walls 333-334 may be configured to form at least a portion of a center conductor of magnetic device 300K, and outer conductive polymer walls 332 and 335 may be configured to form at least a portion of an outer conductor of magnetic device 300K, and both should be at least approximately 2 or 3 times the skin depth of the electromagnetic field at which magnetic structure 300K is designed to operate. For example, for 30 GHz electrical signals, inner conductive polymer walls 333-334 need not be thicker than 3-5 um (e.g., approximately twice the electromagnetic skin depth of the conductive polymer with respect to electromagnetic waves propagating along inner conductive polymer walls 333-334 at that operating frequency), thereby facilitating the compactness of magnetic device 300K and allowing for nearly ideal magnetic coupling between ferrite matrix 328 and a ferromagnetic matrix embedded within a center conductor or outer conductor of magnetic device 300K, described more fully with respect to FIGS. 3G-3K and 4A-B. In various embodiments, inner conductive polymer walls 333-334 and/or outer conductive polymer walls 332 and 335 may be nonmagnetic, similar to any structures formed with a conductive polymer, as described herein.

In FIG. 3G, a ferromagnetic matrix 338 may be formed on copper film 326 over ferrite matrix 328 and within center cavity 333F to form magnetic device 300G. For example, ferromagnetic matrix 338 may be formed using MMAMS 110. In some embodiments, MMAMS 110 may be implemented with an FFF AMS, for example, and ferromagnetic matrix 338 may include ferromagnetic powder impregnated filament polymer (e.g., NdFeB powder impregnated filament ABS) prepared by preparation system 211, for example, and provided to supplier 115 of MMAMS 110. In other embodiments, MMAMS 110 may be implemented with a stereolithographic AMS, for example, and ferromagnetic matrix 338 may include ferromagnetic powder impregnated liquid polymer mixed together or otherwise prepared by preparation system 211, for example, and provided to supplier 115 of MMAMS 110. In various embodiments, ferromagnetic matrix 338 may be approximately 125 um thick and substantially fill center cavity 333F. Subsequent to formation of magnetic device 300K, ferromagnetic matrix 338 may be magnetized (e.g., using a magnetic field generator) to create a magnetic field appropriate to interact with ferrite matrix 328 to create one or more electromagnetic wave propagation modification/adjustment devices, as described herein. A cured or otherwise solidified ferromagnetic matrix 338 may also be referred to as a ferromagnetic structure and/or ferromagnet.

In FIG. 3H, conductive polymer may be formed on top of inner conductive polymer walls 333-334 and over ferromagnetic matrix 338 to form center conductor 340, conductive polymer may be formed on top of outer conductive polymer walls 332 and 335 to form outer conductive walls 342 and 343, and dissolvable polymer may be formed on top of dissolvable polymer fillers 336-337 and over center conductor 340 to form dissolvable polymer filler 344, in order to form magnetic device 300H. For example, center conductor 340, outer conductive walls 342 and 343, and/or dissolvable polymer filler 344 may be formed using an AMS (e.g., other subsystems 230) configured to use ABS conductive polymer (as in FIG. 3B) and/or dissolvable polymer, as appropriate. In some embodiments, center conductor 340 may be formed to be approximately 20-40 um thick above ferromagnetic matrix 338. In related embodiments, dissolvable polymer filler 344 may be formed to be approximately 20-40 um thick over center conductor 340, and outer conductive walls 342 and 343 may be formed to be substantially flush with a top surface of dissolvable polymer filler 344. In various embodiments, center conductor 340 may include portions of copper seed layer 330.

In FIG. 3I, conductive polymer may be formed on top of outer conductive walls 342 and 343 and over dissolvable polymer filler 344 to form outer conductor 346, to form magnetic device 300I. For example, outer conductor 346 may be formed using an AMS (e.g., other subsystems 230) configured to use ABS conductive polymer (as in FIG. 3B). In some embodiments, outer conductor 346 may be formed to be approximately 50 um thick above dissolvable polymer filler 344. In various embodiments, outer conductor 346 may include portions of left and right conductive polymer mesas 324 and 325, copper layer 322, and/or copper layer 326.

In FIG. 3J, dissolvable polymer filler 344 may be removed to form a dielectric 348 (e.g., an air gap) and to form magnetic device 300J. For example, dissolvable polymer filler 344 may be dissolved or otherwise removed from three of the cross sectional sides shown in FIG. 3J by solvent applied by immersion system 228, which can enter and exit the space between center conductor 340 and outer conductor 346 through end faces and/or access holes (not explicitly shown in FIG. 3J) formed through outer conductor 346. In some embodiments, dielectric 348 may be implemented with other dielectric materials that may be dispensed and/or otherwise formed in the space between center conductor 340 and outer conductor 346. For example, in some embodiments, ferrite matrix 328 and dielectric 348 may together form a dielectric for magnetic device 300J.

In FIG. 3K, copper layer 350 may be formed on all accessible conductive surfaces of magnetic device 300J in order to form magnetic device 300K. For example, copper layer 350 may be formed by electroformation system 224, and copper layer 250 can be applied to cover the outside of center conductor 340 and the outside and inside of outer conductor 346 (e.g., to form, at least in part, a metallic surface layer on center conductor 340 and/or outer conductor 346). In some embodiments, copper layer 350 may be approximately 3-10 um thick (e.g., approximately 2-3 times the skin depth at the operating frequency plus sufficient thickness to compensate for any surface roughness and/or other imperfections in the accessible conductive surfaces of magnetic device 300J). Each of FIGS. 3A-3K illustrate cross sections of magnetic devices, and it is understood that the structure shown in FIGS. 3A-3K can be extended in any longitudinal shape to form a transmission line, similar to the shapes presented in FIG. 5A. Also, although the coaxial dielectric shown in the embodiment presented by FIG. 3K is primarily dielectric (e.g., air gap) 348 and ferrite matrix 328, in other embodiments, dielectric 348 may be replaced with a different dielectric material having different dielectric characteristics, for example, and ferrite matrix 328 may be supplemented with additional layers of dielectric material, which may be disposed beneath ferrite matrix 328.

Also shown in FIG. 3K are directions 352 and 354. In various embodiments, a strength and/or orientation of a poling field (e.g. provided by ferromagnetic matrix 338) can be selected to modify a propagation characteristic (e.g., a phase shift, or a delay) in a particular way. For example, when the direction of the poling field is perpendicular to the propagation direction and the plane of ferrite matrix 328, as shown with direction 352, magnetic device 300K corresponds to a reciprocal phase shifter or other type of reciprocal device. By contrast, when the direction of the poling field (e.g., as set by a magnetic field generator acting on ferromagnetic matrix 338) is perpendicular to the propagation direction but coplanar with the plane of ferrite matrix 328, as shown with direction 354, magnetic device 300K corresponds to a non-reciprocal phase shifter and/or other non-reciprocal device.

In addition, ferromagnetic matrix 338 may in some embodiments be implemented with a soft ferromagnet (e.g., formed using NiFe powder, for example), which can be used to dynamically control polarization of ferrite matrix 328 and therein the phase shift response of magnetic device 300K. In such embodiments, the soft ferromagnetic matrix must be magnetized by an externally applied field, such as by a solenoid and/or by positioning a permanent magnet in close proximity (e.g., using a placement device and/or an embodiment of MMAMS 110).

Figure 4F:
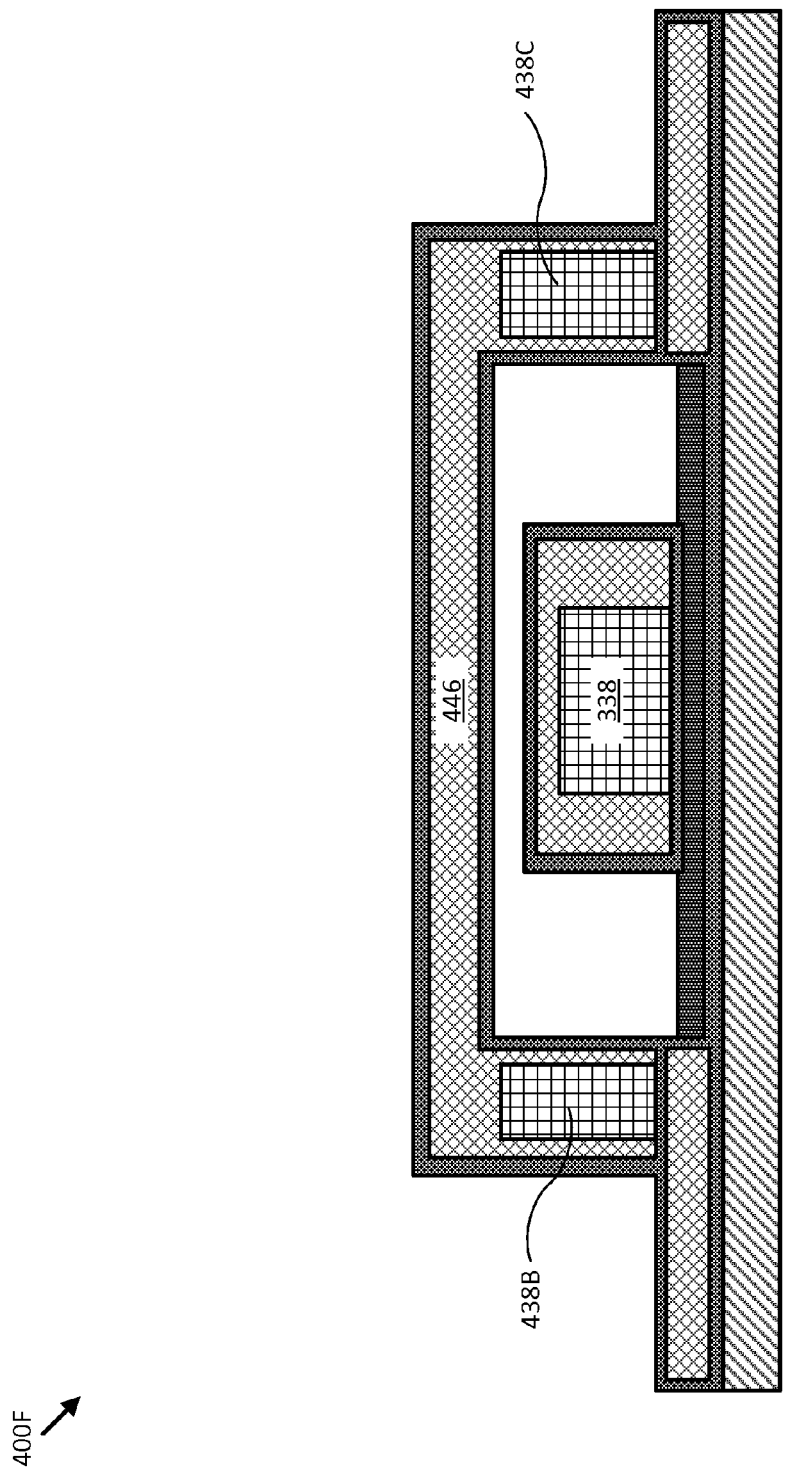

FIGS. 4A-F illustrate magnetic devices and/or structures formed in accordance with an embodiment of the disclosure, such as using processes similar to those discussed with reference to FIGS. 3A-K. In particular, FIG. 4A shows a transmission line 400A similar to magnetic device 300K, but where center conductor 440 includes separator 441 separating ferromagnetic matrix 438 from ferrite matrix 328 to increase the conductivity of center conductor 440 and/or reduce the effect of the electromagnetic wave propagation modification/adjustment device by reducing the magnetic field strength across ferrite matrix 328.

FIG. 4B illustrates a magnetic device and/or structure 400B in accordance with an embodiment of the disclosure. In particular, FIG. 4B shows a transmission line similar to magnetic devices 300K and/or 400A, but where center conductor 440B is solid conductive polymer, and ferromagnetic matrix 438 is split into two separate ferromagnetic matrixes 438B-C, formed within opposing portions of outer conductor 446, that are configured (e.g., shaped and/or placed) to provide additional magnetic field strength and/or uniformity over ferrite matrix 428. As noted above, ferromagnetic matrixes 438B-C may be implemented with hard or soft ferromagnetic material.

FIG. 4C illustrates a magnetic device and/or structure 400C in accordance with an embodiment of the disclosure. In particular, FIG. 4C shows a transmission line similar to a combination of magnetic devices 400A and 400B, including all three ferromagnetic matrixes 438, 438B, and 438C, which may be implemented with hard or soft ferromagnetic material.

FIG. 4D illustrates a magnetic device and/or structure 400D in accordance with an embodiment of the disclosure.

In particular, FIG. 4D shows a transmission line similar to magnetic devices 300K, and/or 400A-C, including a solid center conductor 440B, but including a single ferromagnetic matrix 438D (e.g., which may be implemented with hard or soft ferromagnetic material) embedded in a top portion of outer conductor 446D opposite center conductor 440B from ferrite matrix 328. FIG. 4E shows a transmission line 400E very similar to magnetic device 400D, including a solid center conductor 440B, but including a single ferromagnetic matrix 438E (e.g., which may be implemented with hard or soft ferromagnetic material) disposed below RF dielectric board 320 and adjacent to ferrite matrix 328.

FIG. 4F illustrates a magnetic device and/or structure 400F in accordance with an embodiment of the disclosure. In particular, FIG. 4F shows a transmission line similar to a combination of magnetic devices 300K and 400B, including all three ferromagnetic matrixes 338, 438B, and 438C, which may be implemented with hard or soft ferromagnetic material.

Figure 5A:
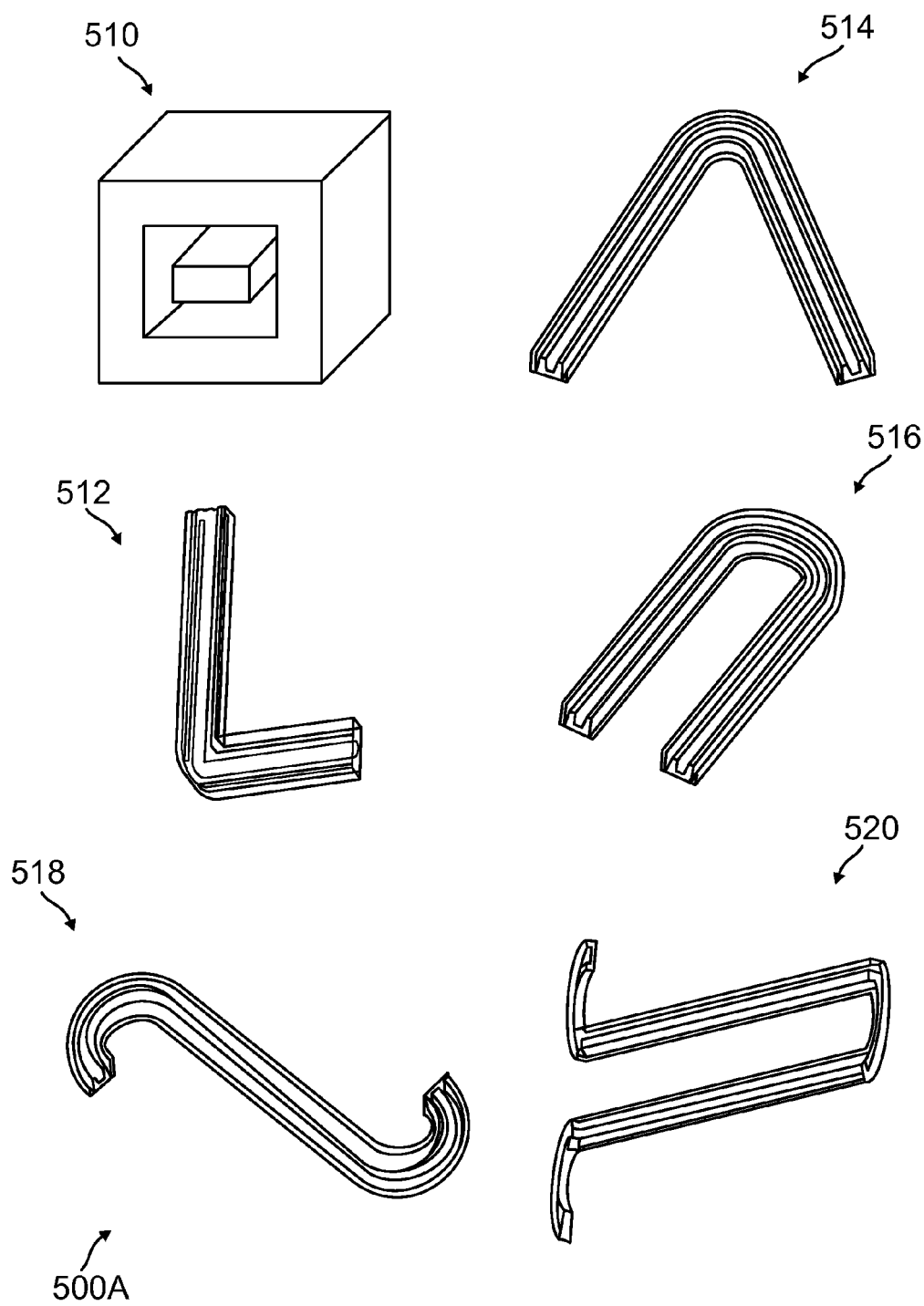
FIG. 5A illustrates diagrams of various shapes for a magnetic device and/or structure in accordance with an embodiment of the disclosure.

FIG. 5A illustrates diagrams of various shapes for a magnetic device and/or structure in accordance with an embodiment of the disclosure. In particular, FIG. 5A presents perspective views of different layouts or fabrication patterns or shapes for transmission lines and/or waveguides formed using similar methods as those presented with respect to FIGS. 3A-K and/or 4A-F. For example, magnetic device 510 shows a rectangular coaxial transmission line that is relatively straight, magnetic device 512 shows an elongated rectangular coaxial transmission line formed with a 90 degree bend, magnetic device 514 shows an elongated rectangular coaxial transmission line formed with a sharper approximate 45 degree bend, magnetic device 516 shows an elongated rectangular coaxial transmission line formed with a 180 degree bend, magnetic device 518 shows an elongated rectangular coaxial transmission line formed with an "S" bend or two adjacent approximate 180 degree bends, and magnetic device 520 shows an elongated rectangular coaxial transmission line formed with two "S" bends. Embodiments of the present disclosure may combine various aspects of the illustrated shapes to construct a variety of different transmission lines and/or other magnetic devices with varying electromagnetic wave propagation modification capabilities and/or ranges of capabilities.

Figure 5B:
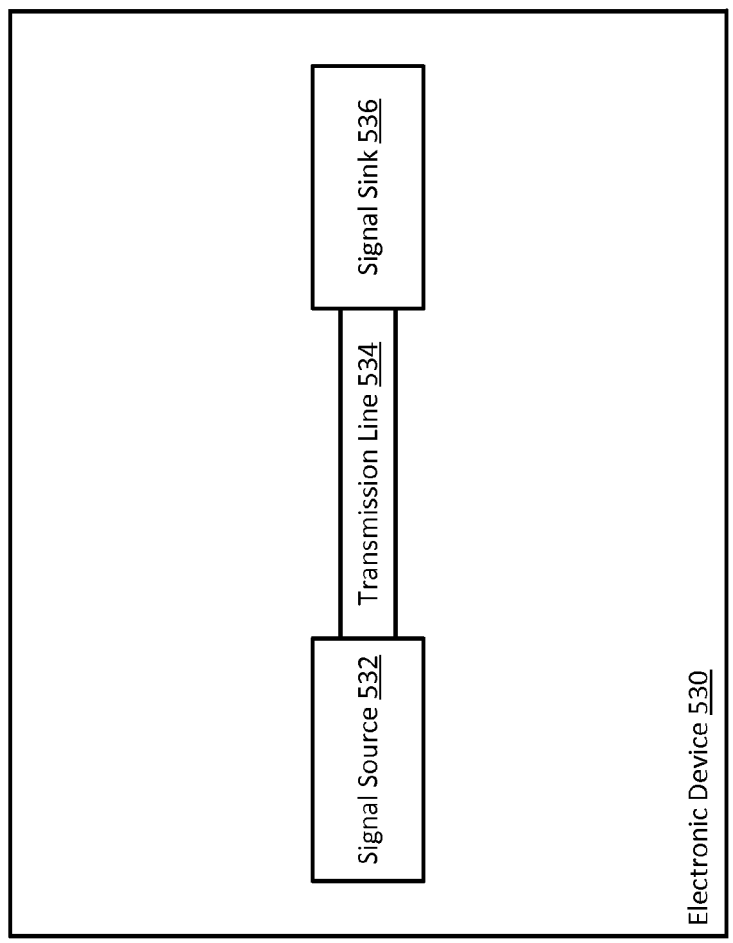
FIG. 5B illustrates a magnetic device and/or structure implemented in an electronic device in accordance with an embodiment of the disclosure.

As an example, FIG. 5B illustrates a magnetic device and/or structure implemented in an electronic device in accordance with an embodiment of the disclosure. For example, electronic device 530 may include a signal amplifier, a filter, a receiver, a transmitter, a transceiver, and/or other circuitry configured to provide an electronic function for electronic device 530, which may be implemented as a radar system, a communications system, a processing system, various other ranging sensor systems, and/or other electronic devices. In the embodiment shown in FIG. 5B, electronic device 530 includes a signal source 532, a transmission line 534, and a signal sink 536. For example, signal source 532 may be a transmitter, transmission line 534 may be a magnetic device configured to couple signal source 532 to signal sink 536 and/or to provide a desired phase shift and/or delay for an electromagnetic wave travelling through transmission line 534, and signal sink 536 may be an antenna (e.g., a patch antenna array) or an optical aperture. In general, signal source 532 may be any electronic device configured to generate or provide an electromagnetic signal, transmission line 534 may be any embodiment of the present disclosure including a magnetic structure and/or device configured to modify electromagnetic waves/signals as they propagate through transmission line 534, and signal sink 536 may be any electronic device and/or element configured to receive an electromagnetic wave from signal source 532 and/or transmission line 534. Embodiments of electronic device 530 may be configured (e.g., scaled) to operate over a frequency range and/or according to various applications from 100-400 MHz up to approximately 60 GHz or higher, for example.

Figure 6:
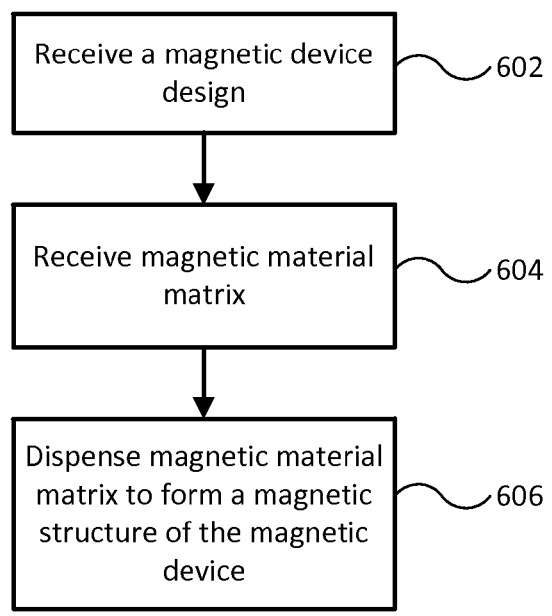
FIG. 6 illustrates a flow diagram of various operations to form a magnetic device and/or structure using a magnetic materials additive manufacturing system in accordance with an embodiment of the disclosure.

FIG. 6 illustrates a flow diagram 600 of various operations to form a magnetic device using an MMAMS in accordance with an embodiment of the disclosure. In some embodiments, the operations of FIG. 6 may be implemented as software instructions executed by one or more logic devices associated with corresponding elements of FIGS. 1-2. More generally, the operations of FIG. 6 may be implemented with any combination of software instructions and/or electronic hardware (e.g., inductors, capacitors, amplifiers, or other analog and/or digital components). Any step, sub-step, sub-process, or block of process 600 may be performed in an order or arrangement different from the embodiments illustrated by FIG. 6. For example, in other embodiments, one or more blocks may be omitted from the various processes, and blocks from one process may be included in another process. Furthermore, block inputs, block outputs, and/or other operational parameters may be stored prior to moving to a following portion of a corresponding process. Although process 600 is described with reference to elements of FIGS. 1-5B, process 600 may be performed by other elements and including a different selection of user modules, system fabrics, and/or subsystems.

In block 602, an MMAMS receives a magnetic device design. For example, controller 112 of MMAMS 110 may be configured to receive a data file comprising a magnetic device design corresponding to magnetic device/transmission line 300K. In some embodiments, a magnetic device design may be stored on a memory device that is coupled to controller 112 over an interface. Once received, controller 112 may be configured to convert or interpret the magnetic device design to control various elements of MMAMS 110 to construct or form magnetic device 300K. In other embodiments, controller 212 may be configured to receive the data file and to coordinate with controller 112 and/or other elements of fabrication system 220 to control various elements of fabrication system 220 to construct or form magnetic device 300K.

In block 604, an MMAMS receives magnetic material matrix. For example, depending on the type(s) of AMS integrated into MMAMS 110, MMAMS 110 may be configured to receive magnetic matrix liquid and/or magnetic matrix filament from preparation system 211 at supplier 115. In general, MMAMS 110 may be configured to receive any type of magnetic material matrix with which it is able and/or configured to form magnetic structures. Prior to receiving the magnetic material matrix, preparation system 211 may be configured to mix ferrite or ferromagnetic powder with a liquid polymer resin to form bulk liquid magnetic matrix, for example, and either provide the bulk liquid magnetic matrix to supplier 115 or first cure or solidify the bulk liquid magnetic matrix to form bulk solid magnetic matrix, extrude magnetic matrix filament from the bulk solid magnetic matrix, and then provide the magnetic matrix filament (e.g., on a reel or spool) to supplier 115.

In block 606, an MMAMS dispenses magnetic material matrix received in block 604 to form a magnetic structure of the magnetic device described in the magnetic device design received in block 602. For example, controller 112 of MMAMS 110 may be configured to control dispenser 114 to dispense liquid or filament or other type of magnetic material matrix to form ferrite matrix/structure 328 and/or ferromagnetic matrix/structure 338 of magnetic device 300K. In embodiments where a magnetic structure includes a ferrite matrix, the ferrite matrix may be configured to receive a poling field from a ferromagnet. In embodiments where a magnetic structure includes a ferromagnetic matrix, the ferromagnetic matrix may be configured to provide a poling field to a ferrimagnet. By providing such magnetic structures and/or devices in the context of additive manufacturing processing, embodiments of the present disclosure enable formation of magnetic devices relatively quickly, compactly, and inexpensively. Moreover, such devices exhibit excellent performance relative to conventional phase shift technology, for example, can reduce size, insertion loss, and weight to approximately 0.1 cubic inch, 0.05 dB, and less than 100 grams for each device, and can operate reliably when conveying more than 1 Watt of transmitted power (e.g., for phased radar array applications). Conventional systems are typically an order of magnitude worse across the range of performance metrics, at much higher overall cost.

Figure 7:
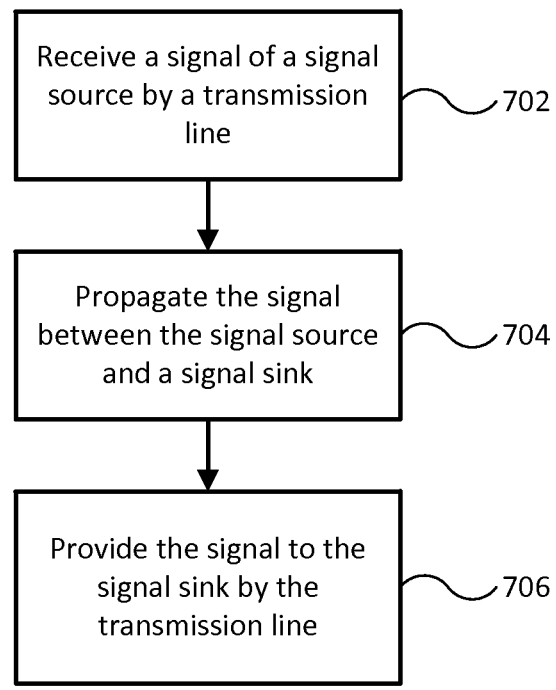
FIG. 7 illustrates a flow diagram of various operations to use a magnetic device and/or structure in accordance with an embodiment of the disclosure.

FIG. 7 illustrates a flow diagram 700 of various operations to use a magnetic device and/or structure in accordance with an embodiment of the disclosure. In some embodiments, the operations of FIG. 7 may be implemented as software instructions executed by one or more logic devices associated with corresponding elements of FIGS. 1-2. More generally, the operations of FIG. 7 may be implemented with any combination of software instructions and/or electronic hardware (e.g., inductors, capacitors, amplifiers, or other analog and/or digital components). Any step, sub-step, sub-process, or block of process 700 may be performed in an order or arrangement different from the embodiments illustrated by FIG. 7. For example, in other embodiments, one or more blocks may be omitted from the various processes, and blocks from one process may be included in another process. Furthermore, block inputs, block outputs, and/or other operational parameters may be stored prior to moving to a following portion of a corresponding process. Although process 700 is described with reference to elements of FIGS. 1-5B, process 700 may be performed by other elements and including a different selection of user modules, system fabrics, and/or subsystems.

In block 702, a signal of signal source is received by a transmission line. For example, transmission line 534 of electronic device 530 may be configured to receive a signal (e.g., an electrical signal, an optical signal, and/or any other type of propagating electromagnetic wave, for example) from signal source 532. In various embodiments, transmission line 534 may be implemented according to magnetic device 300K, 400A, 400B, and/or any of magnetic devices 510-520, using an embodiment of MMAMS 110 and/or fabrication system 220, as described herein.

In block 704, the signal received in block 702 is propagated between a signal source and a signal sink. For example, transmission line 534 may be configured to propagate a signal received from signal source 532 between signal source 532 and signal sink 536. As described herein, magnetic structures within transmission line 534 may be configured/formed to modify a propagation characteristic of an electromagnetic wave associated with the propagated signal. For example, transmission line 534 may be configured to apply a phase shift, a true delay, a filter characteristic, and/or other propagation characteristic modifications to the signal as it propagates through transmission line 534.

In block 706, the signal propagated in block 704 is provided by a transmission line to a signal sink. For example, transmission line 534 may be configured to provide a signal propagated by transmission line 534 between signal source 532 and signal sink 536 to signal sink 536. By implementing signal transmission using embodiments of the magnetic structures and/or devices formed using the magnetic materials additive manufacturing systems described herein, embodiments of the present disclosure provide inexpensive, compact, and robust electronic devices, which can be integrated into a variety of systems, such as navigational sensors and/or other systems used in operation of an aircraft.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system (530), comprising:
a transmission line (534) coupled between a signal source (532) and a signal sink (536), wherein:
the transmission line comprises a center conductor (340, 440, 440B) separated from an outer conductor (346, 446) by at least one dielectric (328, 348);
the at least one dielectric comprises a ferrite matrix (328) dispensed by a magnetic materials additive manufacturing system "MMAMS" (110); and
at least one of the center conductor and the outer conductor comprise a ferromagnetic matrix (338, 438, 438B-C) dispensed by the MMAMS and configured to provide a poling field to the ferrite matrix to modify an electromagnetic propagation characteristic of an electromagnetic wave while it propagates between the signal source and the signal sink.

2. The system of claim 1, wherein:
the poling field comprises at least one of a strength and an orientation relative to a propagation direction of the electromagnetic wave that is selected to modify at least one of a phase shift and a delay associated with the electromagnetic wave.

3. The system of claim 1, wherein:
the ferromagnetic matrix is disposed within the center conductor; and
a thickness of a nonmagnetic portion of the center conductor surrounding the ferromagnetic matrix is greater than or equal to approximately two to three times a skin depth corresponding to the electromagnetic wave.

4. The system of claim 1, wherein:
the ferromagnetic matrix is disposed within the center conductor;
the center conductor comprises a nonmagnetic conductive polymer (340, 440, 440B) and a metallic surface layer (330, 350); and
the ferrite matrix is separated from the ferromagnetic matrix by the metallic surface layer.

5. The system of claim 1, wherein:
the ferromagnetic matrix comprises a first ferromagnetic matrix (438B) disposed within a first portion of the outer conductor;
the outer conductor comprises a second ferromagnetic matrix (438C) disposed within a second portion of the outer conductor opposite the center conductor;
the ferrite matrix is disposed at least between the first and second portions of the outer conductor; and
the first and second ferromagnetic matrixes are configured to provide the poling field.

6. The system of claim 1, wherein:
the transmission line comprises a rectangular coaxial transmission line; and
the at least one dielectric comprises an air gap disposed on three of four cross sectional sides of the center conductor.

* * * * *